(12) United States Patent
McAndrew, III

(10) Patent No.: US 7,957,861 B2
(45) Date of Patent: Jun. 7, 2011

(54) TRACKING EMISSIONS DATA

(75) Inventor: Willard G. McAndrew, III, Plano, TX (US)

(73) Assignee: WMDM Family Ltd., Plano, TX (US)

( * ) Notice: Subject to any disclaimer, the term of this patent is extended or adjusted under 35 U.S.C. 154(b) by 0 days.

(21) Appl. No.: 12/630,343

(22) Filed: Dec. 3, 2009

(65) Prior Publication Data

US 2010/0152958 A1 Jun. 17, 2010

(51) Int. Cl.
*G06F 7/00* (2006.01)
(52) U.S. Cl. ........................................................ 701/29
(58) Field of Classification Search .................... 701/29, 701/36, 200, 213
See application file for complete search history.

(56) References Cited

U.S. PATENT DOCUMENTS

| | | | |
|---|---|---|---|
| 6,482,080 B2 | 11/2002 | Wilson et al. | |
| 6,705,938 B2 | 3/2004 | Everhart et al. | |
| 7,753,765 B2 | 7/2010 | Wilson et al. | |
| 7,811,159 B2 | 10/2010 | Wilson et al. | |
| 2005/0113014 A1 | 5/2005 | Everhart et al. | |
| 2006/0154591 A1 | 7/2006 | Everhart et al. | |
| 2008/0154671 A1* | 6/2008 | Delk | 705/7 |
| 2009/0240388 A1* | 9/2009 | Harris | 701/22 |
| 2010/0093268 A1 | 4/2010 | McCall et al. | |

* cited by examiner

*Primary Examiner* — Kim T Nguyen
(74) *Attorney, Agent, or Firm* — Banner & Witcoff, Ltd.

(57) ABSTRACT

A system for use in transport vehicles includes an auxiliary power unit (APU) for a transport vehicle, the APU having a locator unit for use in a tracking and monitoring system 5 for communicating over a communication network. The locator unit can be attached to or installed within the APU or any other form of auxiliary provided power. Furthermore, the locator unit can have multiple sensor inputs that can read and store sensor data, including location information and emissions output. Then, the locator unit can transmit that information to a remote monitoring station or can use that information to calculate emission reduction data information for conversion to one or more emission reduction credits.

20 Claims, 11 Drawing Sheets

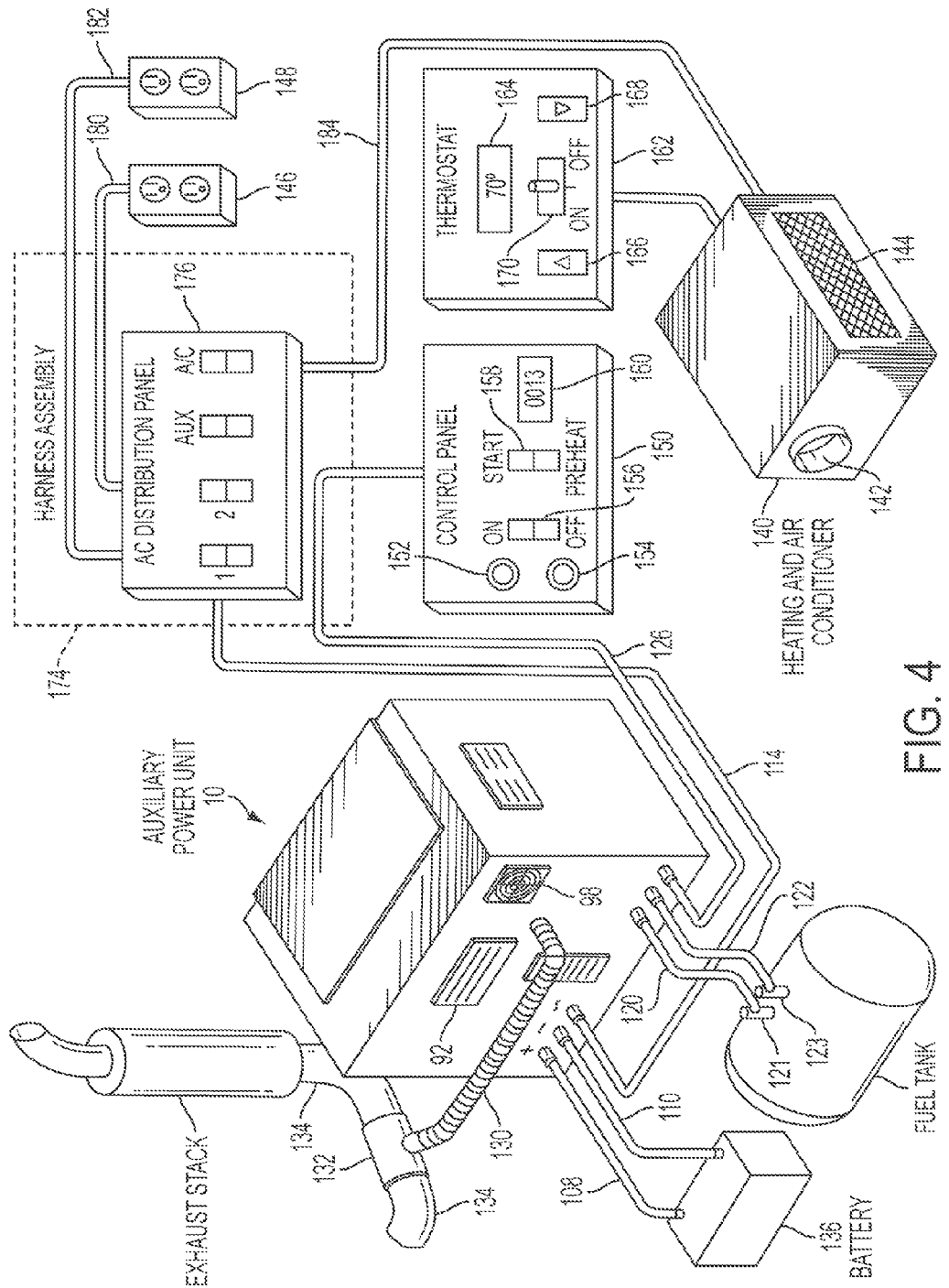

TRACKING EMISSIONS DATA

TECHNICAL FIELD

The invention generally relates to auxiliary power units for use on transport vehicles powered by internal combustion engines to provide electrical power during periods when the transport vehicle's main engine must be shut off. More particularly, the invention relates to the field of pollution control and monitoring, in particular, emissions from utilization of fossil fuels in motor vehicles involved in the transportation of persons and goods, and the ability to track and record emissions data from motor vehicles as a tool in quantifying and controlling emission causing pollution.

BACKGROUND

Over 15 million diesel-powered trucks and other diesel powered vehicles provide long-haul transport of goods throughout the United States. A common practice among truckers is to leave the large diesel engines that power these trucks running (i.e., idling) during overnight stops. This practice occurs for a number of reasons, such as (1) to keep the cab and the sleeper compartment warm or cool; (2) to keep the diesel fuel warm during the winter months; (3) to keep the engine warm to avoid cold starting problems; (4) to mask other noises; (5) to enable use of various electrical devices in the truck cab, etc. However, because these large engines burn significant amounts of diesel fuel and/or gasoline fuel to power their engines, an excess amount of fuel far greater than the amount needed is wasted to provide power for these benefits to the drivers. This fuel consumption needlessly consumes a non-renewable energy resource, burdens the costs of shipping goods with unnecessary expense, and increases maintenance costs due to the excess wear that results from running the engines for uses other than pulling a loaded trailer. Furthermore, idling results in significant amounts of pollution because the use of the fuel in the engines produces emissions, such as nitrogen oxides ("NOx"), which are harmful to the environment, and in increased health care costs to treat illnesses caused by the emissions from the engines.

In response to these negative concerns, federal, state, and local governments have made controlling motor vehicle emissions a major focus of environmental controls, and many have taken measures to control the pollution from motor vehicles. For example, in some jurisdictions, idling the engines of these transport vehicles for substantial periods of time violates various laws and regulations. Other jurisdictions have addressed this issue by providing economic incentives for achieving reductions in the emissions of pollutants. In such a plan, a central authority sets a limit or cap on the amount of a pollutant that can be emitted. Companies or other groups that emit the pollutant are given credits or allowances which represent the right to emit a specific amount of those pollutants. The total amount of credits cannot exceed the cap, limiting total emissions to that level. Companies that pollute beyond their allowances must buy credits from those who pollute less than their allowances. These transfers are referred to as trades. In effect, the buyer is being fined for polluting, while the seller is being rewarded for having reduced emissions.

A number of solutions to the idling problem have been developed and are currently in use. These conventional systems generally employ an auxiliary power unit ("APU") that runs on diesel fuel and drives an electric alternator or generator to supply operating voltages for heating and cooling the cab and/or sleeper compartment ("cabin") or recharging the truck battery. However, each of these conventional systems has one or more of the following disadvantages: (1) the engine of the APU is water cooled and must be tied into the radiator system of the truck or be provided with its own radiator, hoses, water pump, etc.; (2) the engine of the APU drives the alternator or generator via a belt drive, which is associated with reduced efficiency, reliability, and additional maintenance costs; (3) the APU mechanically drives the A/C compressor for an auxiliary cooling system located in the cabin of the truck; (4) the APU requires extensive integration into the truck fuel, cooling, exhaust and electrical systems, which increases the cost of installing and maintaining the APU and reduces the reliability of the combined systems; (5) the integration of the APU into the truck systems increases the mechanical complexity thereof resulting in reduced reliability; (6) the APU is unable to monitor the amount of emissions the vehicle produces; and (7) the APU itself tends to be heavier and less efficient than it could be using modern technology.

As an illustration, conventional auxiliary power units are typically liquid cooled and require a radiator, a water pump, hoses, thermostat, etc., along with the mechanical structure to support them. Conventional auxiliary power units also use some form of adapter that employs a belt, chain, clutch or gear set to couple the engine to the generator, which adds weight, mechanical complexity and additional maintenance requirements. The additional circuitry adds weight, complexity, maintenance requirements and cost, all without improving the conversion efficiency of the auxiliary power unit. Efficiency is reduced in any of these conventional auxiliary power units because the motive power supplied by the engine must be large enough to overcome the extra losses associated with the more complex conventional auxiliary power units.

SUMMARY

Aspects of the invention provide a compact APU of minimal complexity that overcomes the above disadvantages, is easily integrated into an existing installation with an auxiliary heating and cooling unit, directly and efficiently provides both AC and DC electrical power for the cabin and for battery recharging, and efficiently monitors variables such as vehicle location and emission output to track the location of the vehicle and to control pollution. Additional aspects described herein provide methods and systems for automatically monitoring pollutants and generating climate credits based on the monitoring for transport vehicles of various types.

Accordingly, there is disclosed a high efficiency auxiliary power unit ("APU") for a transport vehicle powered by an internal combustion engine. The APU can include an air-cooled engine that uses the fuel supply and the engine exhaust system of the transport vehicle and can have an integral, forced-air cooling system. An air-cooled, brushless generator, having an integral, forced-air cooling system can be directly attached to an output shaft of the air-cooled engine, and can provide simultaneous high voltage AC and low voltage DC outputs. An enclosure can surround the air-cooled engine and the air-cooled brushless generator and can provide protection and mechanical support. There can be a system of first and second air ducts within the enclosure which can separately convey cooling air into and through the air-cooled engine and the brushless generator, respectively. The cooling air can be drawn into the first and second air ducts by respective direct drive fan devices integrated in the air-cooled engine and in the brushless generator, and the cooling air can exit from the enclosure through the first and second air outlets.

In an alternative exemplary embodiment, there can be a system that includes a compact, AC operated auxiliary heating and air conditioning unit operable in the cab of a transport vehicle powered by an internal combustion engine and an auxiliary power unit (APU). Furthermore, the system can have an air-cooled engine directly coupled to a brushless generator that can simultaneously provide a high voltage AC output and a low voltage DC output. When attached to a fuel supply, the APU can operate the exhaust and electrical system of the transport vehicle, supply the AC voltage to the auxiliary heating and air conditioning unit and to at least one AC branch circuit in the cabin of the transport vehicle, and can supply the DC voltage to the electrical system of the transport vehicle. The system can have a control means that is attached to the APU and the auxiliary heating and air conditioning unit that can control the distribution of the high voltage AC output and the low voltage DC output of the APU and that can control the operation of the auxiliary heating and air conditioning unit. The system can have a harness means that can attach the AC output to the auxiliary heating and air conditioning unit to at least one of AC branch circuit, the DC output to the electrical system of the transport vehicle, and the control means to the auxiliary heating and air conditioning unit and to the APU.

In an alternative exemplary embodiment there can be an APU for a transport vehicle that can include an enclosure for housing and supporting the auxiliary power unit on the transport vehicle; an air-cooled diesel engine that can directly drive an air-cooled, brushless generator which provides direct, simultaneous AC and DC voltage outputs; first and second air duct systems within the enclosure that can separately convey cooling air into and through the air-cooled, single cylinder diesel engine and the generator respectively; and an engine exhaust adapter wherein the engine exhaust from the air-cooled diesel engine can be directly attached through the exhaust adapter installed in-line with an exhaust pipe of the transport vehicle between the engine of the transport vehicle and the muffler of the transport vehicle.

In another alternative exemplary embodiment, there can be a system for use in transport vehicles that includes an auxiliary power unit (APU) for a transport vehicle powered by a diesel engine that can have a fuel system, an engine exhaust system, a battery powered electrical system, and a locator unit for use in a tracking and monitoring system for communicating over a communication network. The locator unit can be attached to or installed within the APU. Furthermore, the locator unit can have multiple sensor inputs that can read and store sensor data, including location information and emissions output. Then, the locator unit can transmit this information to a remote monitoring station or can use the information to calculate emission reduction data information for conversion to emission reduction credits.

Additional aspects of the invention provide methods, systems, and computer readable (as well as transport vehicles adapted with systems and computer readable media that perform methods) to receive data for a transport vehicle from a plurality of sensors, where one of the sensors includes a location sensor, and where one of the sensors is usable to determine an amount of pollutant output by the transport vehicle. Aspects further determine, based on the data received from the location sensor, that the transport vehicle is located within a nonattainment area, and calculate an emission reduction credit attributable to the transport vehicle for one or more emission types, based on the data received from the sensor usable to determine the amount of pollutant, for an amount of time during which the transport vehicle is located in the nonattainment area.

BRIEF DESCRIPTION OF THE DRAWINGS

FIG. 4 is a pictorial view illustrating the components of a system application in a transport vehicle including a heating and air conditioning system employing the APU in accordance with an exemplary embodiment of the invention.

DETAILED DESCRIPTION

In the following description the term transport vehicle is taken generally to mean a motorized vehicle, such as a truck, ship or airplane, usually driven by a driver or pilot and used for the shipment of goods over long distances. In an exemplary embodiment, a transport vehicle is a long-haul, diesel powered truck. This type of vehicle often includes a sleeping compartment in the cabin (cab) of the truck tractor unit. This cab is typically equipped with a heating and air conditioning unit, lighting, electrical outlets and small appliances, all of which are powered by an electric generator driven by the truck's engine or an auxiliary engine. Nevertheless, a transport vehicle could as easily be a boat equipped for the same type of shipping service, or even an aircraft configured for long distance hauling to remote areas, for example.

Figure 1:
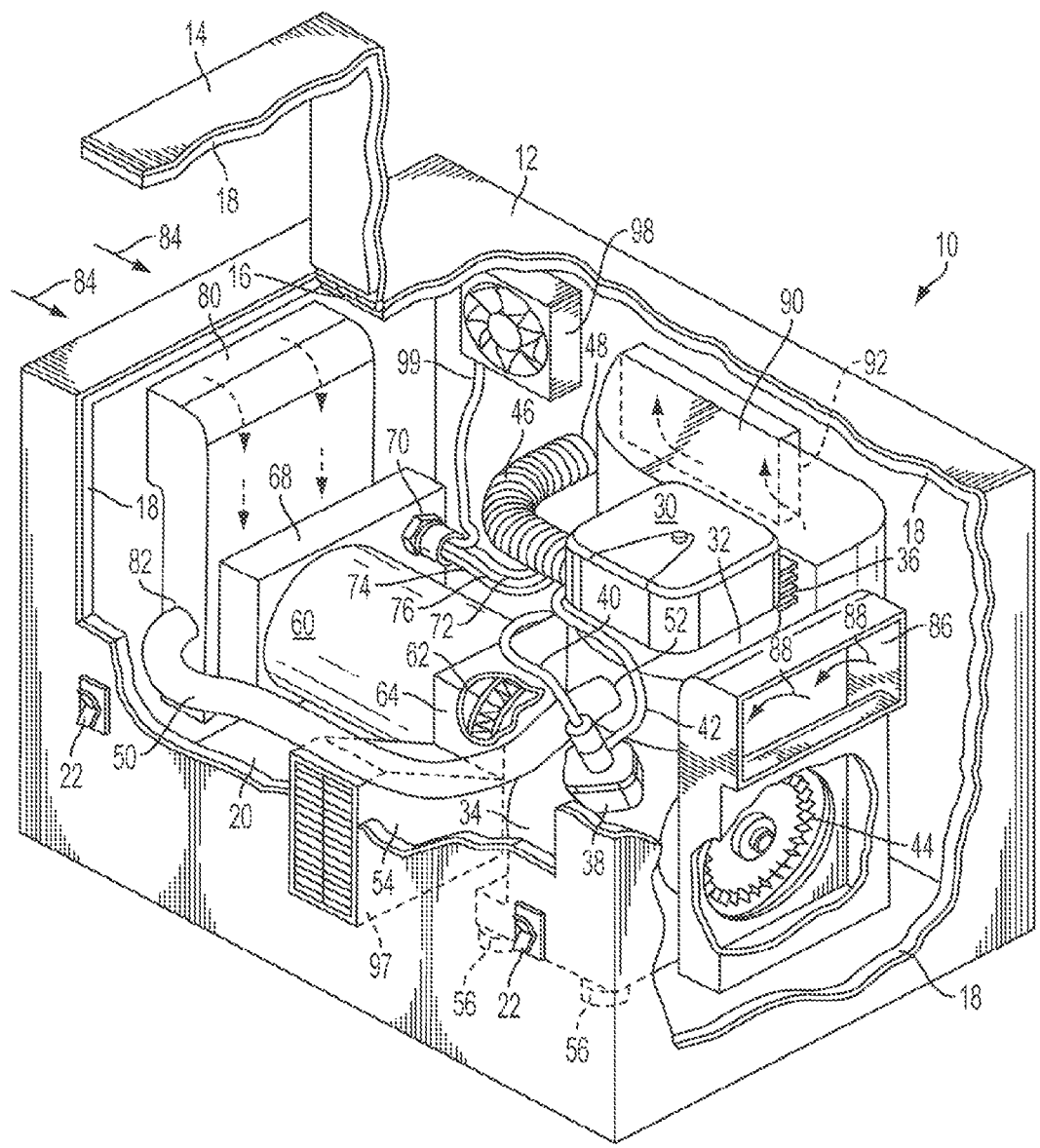
FIG. 1 is an isometric view, partially cutaway, illustrating the front, left corner of an auxiliary power unit (APU), showing the arrangement of internal components and the paths of cooling air flow through the duct systems in accordance with an exemplary embodiment of the invention.

Referring to FIG. 1, there is illustrated an isometric view, partially cutaway, of the front, left corner of an exemplary embodiment of an auxiliary power unit (APU) 10 according to an exemplary embodiment of the invention, from a slightly elevated perspective. Note that the left end of the APU 10 is facing to the right in FIG. 1. The APU 10 is enclosed in an enclosure 12 that includes a hinged cover 14, which pivots about hinge 16 as it is opened. The cover 14 opens to expose the front and upper portions of the interior to enable performing maintenance operations. The enclosure walls may be fabricated out of sheet metal, preferably hardened aluminum plate, such as Tread Brite-3003, to minimize weight. The wall panels are secured to an 'angle iron' frame to form the rectangular-shaped box having dimensions of approximately 26" long×18" wide×19" high. The frame members (not shown) are located at each junction of adjacent wall panels of the enclosure 12. Mounting holes may be positioned in the frame members to support the APU 10 between the frame rails of a transport vehicle or to support the APU against one of the frame rails on the side of the transport vehicle.

The APU 10 in accordance with an exemplary embodiment of the invention, because it is entirely air-cooled and because it employs direct drive between the engine and generator, weighs only approximately 265 pounds. This may be compared with conventional auxiliary power units which are liquid cooled, generally require a converter or an inverter to produce a second voltage output and typically require an adapter that employs a belt, chain, clutch or gear set to couple the engine to the generator. The additional components required in these conventional systems add weight, such that a complete conventional auxiliary power unit often approaches or exceeds a weight of 400 pounds, significantly more than that of the auxiliary power unit according to an exemplary embodiment of the invention. The additional components required in the conventional systems also add complexity, maintenance requirements and cost, all without improving the efficiency. As mentioned previously, efficiency is reduced in any of these conventional auxiliary power units because the motive power supplied by the engine must be large enough to overcome the extra losses associated with the more complex and less efficient conventional auxiliary power units.

Returning now to FIG. 1, the enclosure 12, including the cover 14 is lined on the interior side with a lining 18 on all interior surfaces except the bottom pan 20, and portions of the enclosure 12 where ducts within the enclosure 12 are vented to the exterior of the enclosure 12. The material used for the lining 18 is provided to absorb sound energy generated within the enclosure 12. One material that is suitable is a three-layer, ½ inch thick, Mylar-faced sound insulation product called "GSI Sound Stop Foam" available from Great Southern Insulation Corporation, Fort Lauderdale, Fla. 33335. This product contains three layers of synthetic foam of varying densities to absorb sound energies distributed across a range of frequencies. Other types of sound insulation may also be used. The selection depends on such factors as the particular frequencies and intensities of the sound energy generated within the enclosure 12 and the amounts of attenuation or absorption desired.

Continuing with FIG. 1, a pair of latches 22 secure the cover 14 when it is in a closed position. An air-cooled engine 30 is mounted on the bottom pan 20, near one end of the enclosure 12, supported by vibration-absorbing motor mounts 56. The air-cooled engine 30 includes a cylinder head 32 and a crankcase 34. Air-cooled engine 30 is preferably a diesel engine so that it may use the same fuel that most transport vehicles, into which the APU 10 in accordance with an exemplary embodiment of the invention is installed, currently use. However, air-cooled engine 30 is not limited to diesel fuel and may be selected to operate on any viable fuel as long as a fuel supply is readily available. In an exemplary embodiment, the fuel supply is drawn from the transport vehicle's fuel tank as will be described. The air-cooled engine 30 in the an exemplary embodiment can be a Model 15 LD 350, 7.5 horsepower (Hp), single cylinder diesel engine manufactured by Lombardini Motori of 42100 Reggio Emilia—Italia—ITALY and available from Lombardini USA, Inc., 2150 Boggs Road, Duluth, Ga. 30096. Although a single cylinder engine is suitable for the illustrated exemplary embodiment described herein, there is no necessary limitation to a single cylinder. In some applications the engine of choice may have more than one cylinder and still fall within the scope of the invention. Further, while the typical internal combustion engine employs a crankshaft from which the output is taken, other engine types, such as a Wankel rotary engine that has an output shaft but not a crankshaft, may be well-suited to the APU 10.

A suitable alternative for the air-cooled engine 30 is a Model 15 LD 315, a 6.8 Hp version of the same engine described hereinabove. Other power ratings may be used, the choice being determined by the maximum amount of electrical power to be generated by the APU, which, in the illustrated exemplary embodiment is approximately 5.0 kW. In most cases, the particular power ratings of the engine and generator selected are a function of the particular application and the availability of components having the specific ratings needed. In the APU in accordance with an exemplary embodiment of the invention, the air-cooled engine 30 develops the 7.5 Hp needed to drive the brushless generator to its full output of 5.0 kW. Thus, the approximate efficiency may be calculated as: (5.0 kW/0.746 kW per Hp)/(7.5 Hp)×100=6.7 17.5×100=89%. As will be described, the key relationship between the power ratings of the engine and the generator used in the APU is the efficiency of the unit. It will be appreciated by those skilled in the art that a rotating machine configured as an electric generator needs only a motive force to rotate the rotating element, e.g., the armature of the generator. Thus, any motive force capable of the required torque, speed, etc. would be suitable.

Continuing with FIG. 1, the cylinder head 32 of the air-cooled engine 30 includes an array of cooling fins disposed on the exterior of the cylinder head 32. These cooling fins, as is well-known, increase the radiating surface area of the cylinder head 32 to better dissipate the heat produced by the air-cooled engine 30. Disposed on the side of the crankcase 34 of the air-cooled engine 30 is an injector pump 38. Injector pump 38 receives fuel from inlet fuel line 40 and controls the amount of fuel injected into the air-cooled engine 30. The fuel line 40 delivers fuel from the fuel tank (See FIG. 4) of the transport vehicle carrying the APU 10 via a standpipe unit 121 installed in the fuel tank as shown in FIG. 4. An exemplary standpipe unit used in an exemplary embodiment can be a Model 903210A manufactured by Webasto, a standard, off-the-shelf item. A return fuel line 42 connects a bypass connection of the injector pump 38 back to a standpipe unit 123 installed in the fuel tank.

The air-cooled engine 30 includes a flywheel 44 configured as a fan. The flywheel fan 44 includes a series of radially-disposed vanes shaped to draw outside air inward toward the flywheel through an opening as the flywheel fan 44 rotates when the engine 30 is running The opening is generally round, in a housing that surrounds the flywheel fan 44. The air drawn inward by the vanes on the flywheel fan 44 is forced through an internal duct system alongside the engine, and closely past the cooling fins 36, as will be described. The air-cooled engine 30 also includes an exhaust pipe 46, which couples an exhaust port (not shown) on the cylinder head 32 of the air-cooled engine 30 to an exhaust outlet 48 in a wall of the enclosure 12. In the exemplary embodiment of FIG. 1, the exhaust outlet 48 is on a rear wall of the enclosure 12, for coupling to the exhaust system of the transport vehicle as will be described. In the illustrated exemplary embodiment, the exhaust pipe is a flexible metal tubing. In some applications, the exhaust pipe may be insulated against the escape of heat or excess sound from the engine exhaust. An air intake pipe 50 coupled to an air intake port 52 on the air-cooled engine 30 is provided for conducting outside air for combustion into the air-cooled engine 30. The air intake pipe 50 typically passes through an air cleaner filter, which is not shown for clarity purposes. An air cleaner disposed in the air intake of an internal combustion engine is well-known to persons skilled in the art.

Although not illustrated in the figures, according to alternative exemplary embodiments, the APU can be powered by batteries, fuel cells, and/or alternative fuels instead of or in combination with diesel or other fuels.

Continuing with FIG. 1, an air-cooled, brushless generator 60 is shown directly coupled to the air-cooled engine 30. In the illustrated exemplary embodiment the crankshaft of the air-cooled engine 30 and the armature shaft of the brushless generator 60 are directly coupled together such that both shafts are aligned along the same axis. The coupling includes no belt, chain, clutch, or gear set. The advantages of this configuration are compactness, no slippage in the drive mechanism, quieter operation, efficiency, reliability and lower maintenance. However, it will be appreciated that, in some applications, it is possible for the engine 30 and generator 60 to share a common housing. For example, in technology currently in use in automotive applications a hybrid internal combustion engine and electric motor assembly shares a common block, frame or housing. Thus, there is no reason such a hybrid engine/generator architecture would not also be suitable for the APU in accordance with an exemplary embodiment of the invention.

The air-cooled brushless generator 60 selected for the APU in accordance with an exemplary embodiment of the invention is chosen because of its high efficiency and the capability of providing both high voltage AC and low voltage DC outputs simultaneously and directly, either internally or externally to the generator. This design has the advantages of simplicity, reliability, efficiency, light weight and low maintenance. The air-cooled brushless generator shown in the illustrative exemplary embodiment is a 5.0 Kilowatt (kW) unit supplied by BMZ Generators, Inc., 412 N. Federal Highway, Pompano Beach, Fla. 33062. The AC output is rated at 120 VAC @ 40 Amperes and the DC output is rated at 12 VDC @ 50 Amperes. A variety of other output ratings are available as well as AC outputs having different voltages, single phase or multi-phase, or a choice of 50 Hz or 60 Hz, or in combination with DC voltages at various levels.

The brushless generator 60 is supplied in a cylindrical housing with an air chamber or plenum at each end of the generator 60. An exit fan 62, within an exit plenum 64 at the driven end of the armature shaft next to the air-cooled engine 30, exhausts air warmed within the brushless generator 60, through a series of slots in the sides of the exit plenum 64. The air from the front-oriented side of the exit plenum 64 then travels through a forward air duct 54 and an oil cooler 97 to exit to the outside of the enclosure 12. The air from the rear-oriented side of the exit plenum 64 then travels through a corresponding air duct (shown in FIG. 2 and to be described) to exit to the outside of the enclosure. The exit fan 62 draws cooler outside air into the brushless generator 60 through an inlet air duct 80. The cooler inlet air is directed through the brushless generator 60 where it absorbs heat produced in the generator and conveys it toward the exit fan 62 located in the exit plenum 64.

Continuing with FIG. 1, mounted on an upper corner of the entry plenum 68 is a generator output connector 70. Output connector 70 connects wiring to conduct the AC and DC output voltages from the generator output to a terminal on the rear side of the enclosure 12 (See FIG. 2). The wiring includes a pair of wires 72 supplying the AC voltage to a connector assembly on the rear panel and a pair of wires 74, 76 to supply the positive and negative respective polarities of the DC output voltage to corresponding terminals on the rear panel.

The enclosure 12, described hereinabove, though it resembles a simple box, presented a challenge in the design of the APU in accordance with an exemplary embodiment of the invention because it serves a number of purposes. In addition to providing protection from the weather and road debris and moisture, and providing convenient means for mechanical support on the transport vehicle, the enclosure 12 is relied upon to contain the sound generated within the enclosure by the air-cooled engine and the air-cooled, brushless generator. The sound is partly contained by the enclosure walls and partly absorbed by the sound insulation that lines the interior of the enclosure 12. Efforts, including experimentation, to solve the remaining problem, of removing the heat from within the enclosure 12, led to the configuration of the components of the APU shown in the illustrated exemplary embodiment. Accordingly, the enclosure 12 includes a system of air ducts to direct and control the flow of air into and through the air-cooled engine 30, the air-cooled, brushless generator 60 and the enclosure 12.

As shown in FIG. 1, an air inlet duct 80, having essentially a wide, low profile, rectangular cross-section, provides an enclosed passage for cool, outside air to enter the entry plenum 68 at the air inlet end of the brushless generator 60. The outside air 84, drawn by the exit fan 62, enters an air inlet vent (not shown) on the right side of the enclosure 12, travels downward through the duct 80 into the entry plenum 68. The air travels through the generator housing, picking up heat radiated by the internal structures of the brushless generator 60 and is drawn out through the vents in the sides of the exit plenum 64. The warmed air from the brushless generator 60 is forced away from the exit plenum 64, by the blades of the exit fan 62 within the plenum 64, and through the forward air duct 54 and oil cooler 98 and the rearward air outlet duct (See reference number 100 in FIG. 2) to the outside of the enclosure 12. This generator duct system thus removes heat produced by the brushless generator 60, conforms it to the duct system and prevents it from contributing to the build-up of heat within the enclosure 12. To enhance the heat-confining capability of the generator duct system, the ducts 80, 54, and 100 may be covered with thermal insulating material.

Figure 2:
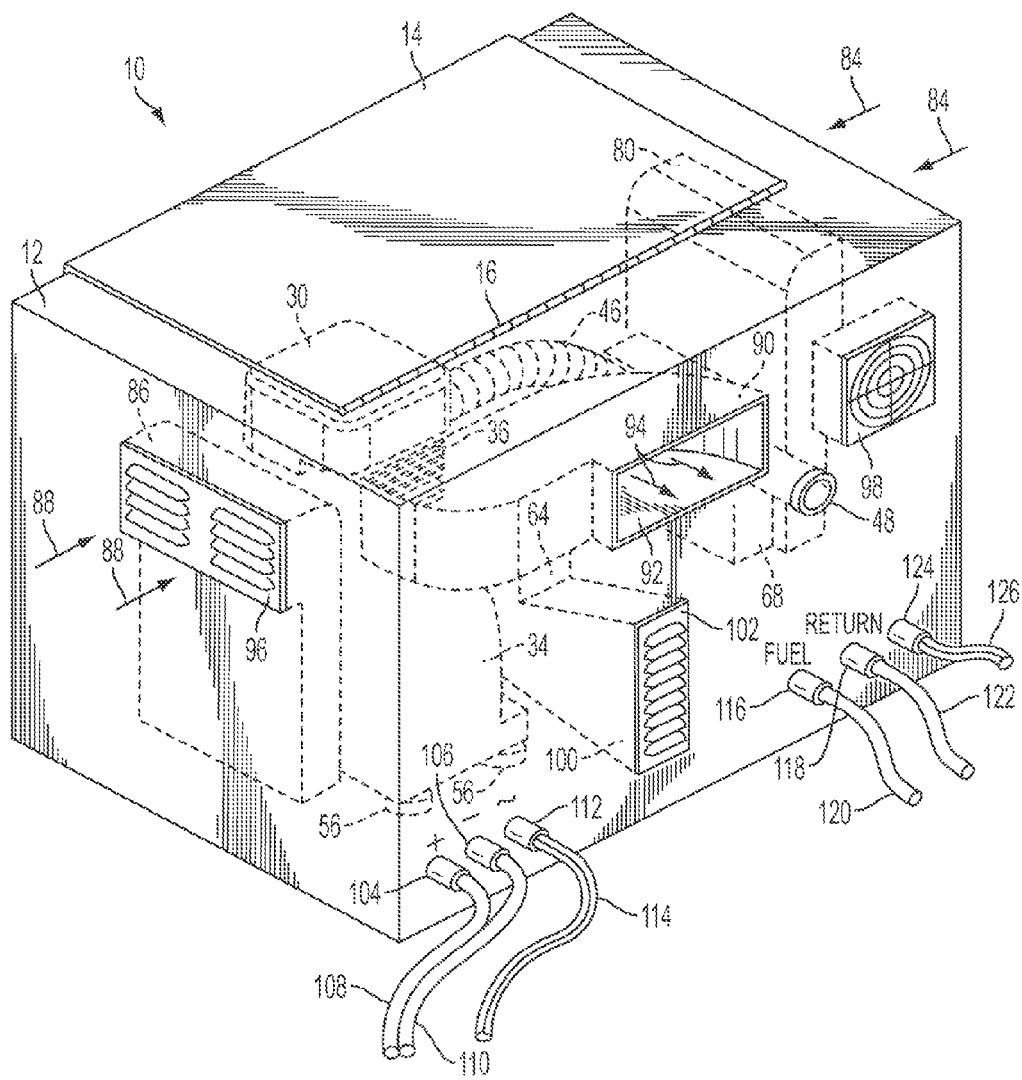
FIG. 2 is an isometric view illustrating the rear, left corner of the (APU) shown in FIG. 1 in accordance with an exemplary embodiment of the invention.

Also shown in FIG. 1 is an air inlet duct 86, having essentially a wide, low profile, rectangular cross-section that provides an enclosed passage for cool, outside air to enter the housing containing the flywheel fan 44 at the air inlet end of the air-cooled engine 30. The outside air 88 enters an air inlet vent (See FIG. 1) on the left side of the enclosure 12, travels downward through the duct 86 into the flywheel housing. There, the blades of the flywheel fan 44 gather the air as the flywheel fan 44 rotates, drawing the inlet air into the flywheel housing of the air-cooled engine 30. The air travels through the engine structure around the cylinder head 32 and past the cylinder head cooling fins 36, picking up heat radiated there-from and is forced into an engine outlet duct 90, through which it travels to an engine air outlet vent 92. In the illustrated exemplary embodiment of the APU 10 the engine air outlet vent 92 is located on a rear panel of the enclosure 12 as shown in FIG. 2. In some applications, it may be advantageous to install an exhaust fan (not shown), which may be thermostatically controlled, in the engine air outlet vent 92 to pull more air through the engine air duct system under heavy loads during periods of very high outside-temperatures. The warmed air from the air-cooled engine 30 is forced through the engine by the blades of the flywheel fan 44 within the flywheel housing of the air-cooled engine 30, and through the engine air outlet duct 92 to the outside of the enclosure 12. This engine duct system thus removes heat produced by the air-cooled engine 30, confines it to the duct system and prevents it from contributing to the build-up of heat within the enclosure 12. To enhance the heat-confining capability of the engine duct system, the ducts 86 and 90 may be covered with thermal insulating material.

Continuing with FIG. 1, an exhaust fan 98 is shown installed on a wall panel of the enclosure 12. Exhaust fan 98 is provided to remove residual hot air from the enclosure 12. Air inlet vents (not shown) may be strategically placed in or near the floor or bottom pan 20 of the enclosure 12 to facilitate air flow produced by the exhaust fan 98. Exhaust fan 98 may also be thermostatically controlled or controlled by a central control system (not shown) located, for example, in the cab of the transport vehicle. The Exhaust fan 98 may be AC or DC powered, with the electric current provided by exhaust fan wires 99. The selection of the fan specification is based on the amount of air, in cubic feet per minute (CFM), that must be moved through the respective duct system to maintain temperatures within acceptable ranges for the particular device involved. Very often the correct specification is determined after laboratory and field testing under actual conditions. Heretofore, field tests of the APU disclosed herein on several long-haul trucks have demonstrated the feasibility of the design described herein.

Referring to FIG. 2, many of the structures to be identified in FIG. 2 are the same as, and bear the same reference numbers as, the structures shown and described in FIG. 1. In FIG. 2 there is illustrated an isometric view of the rear, left corner of an exemplary embodiment of the auxiliary power unit (APU) 10 shown in FIG. 1, showing internal components in phantom lines and the components of the rear wall 21 of the enclosure 12. The enclosure 12 is shown with the cover 14 in a closed position. The cover 14 is attached to the enclosure 12 along a hinge 16. Visible within the enclosure 12 are the air-cooled engine 30, having a crankcase 34 and cylinder head cooling fins 36, mounted on motor mounts 56 on the bottom pan 20. The engine exhaust pipe 46 is shown, as is the exhaust pipe coupling 48 mounted on the rear wall 21 of the enclosure 12. The exit plenum 64 and the entry plenum 68 for the generator 60 are shown, as are the generator air inlet duct 80 and the rearward air outlet duct 100 coupled to a louvered generator air outlet vent 102. Further, there is shown in FIG. 2 the engine air inlet duct 86, which conveys outside air 88 that enters through the louvered panel 96 toward the air-cooled engine flywheel fan 44 as previously described. The warmed air 94 from the air-cooled engine 30, forced through the engine by the blades of the flywheel fan 44 within the flywheel housing of the air-cooled engine 30, is forced through the engine air outlet duct 90 to vent at the air outlet 92 to the outside of the enclosure 12. The fan 98, for venting residual warm air from the enclosure 12, is shown mounted in the upper, right portion of the rear wall 21 of the enclosure 12.

Continuing with FIG. 2, various connections of lines, tubes and wires that communicate with the APU 10 in accordance with an exemplary embodiment of the invention are shown mounted on the rear wall 21 of the enclosure 12. Beginning at the lower left corner of the rear wall of the enclosure 12 in the figure, a positive terminal 104 and a negative terminal 106 for coupling the DC voltage output via respective positive lead 108 and negative lead 110 from the APU to the electrical system of the transport vehicle, generally at the battery, are shown. See, FIG. 4 and the description hereinafter. Next to the negative terminal 106 is an AC terminal 112 coupled to AC leads 114. The AC leads 114, which supply power to the cabin of the transport vehicle, are routed to a control box in the cabin of the transport vehicle as will be described hereinafter during the description of FIG. 4. At the lower right corner of the APU shown in FIG. 2 is a control terminal 124 for coupling a control cable 126 between the APU 10 and the cabin of the transport vehicle. To the left of the control terminal 124 are a pair of fuel line fittings. Inlet fuel fitting 116 receives fuel from the fuel tank of the transport vehicle via a fuel line 120 connected to a standpipe unit installed in the fuel tank. Outlet or return fuel fitting 118 returns bypassed fuel to the fuel tank of the transport vehicle via a fuel line 122 and a standpipe 123. Further details of the lines, tubes and wires that communicate between the APU 10 and the cabin of the transport vehicle or the electrical or exhaust systems of the transport vehicle will be described hereinafter.

Figure 3:
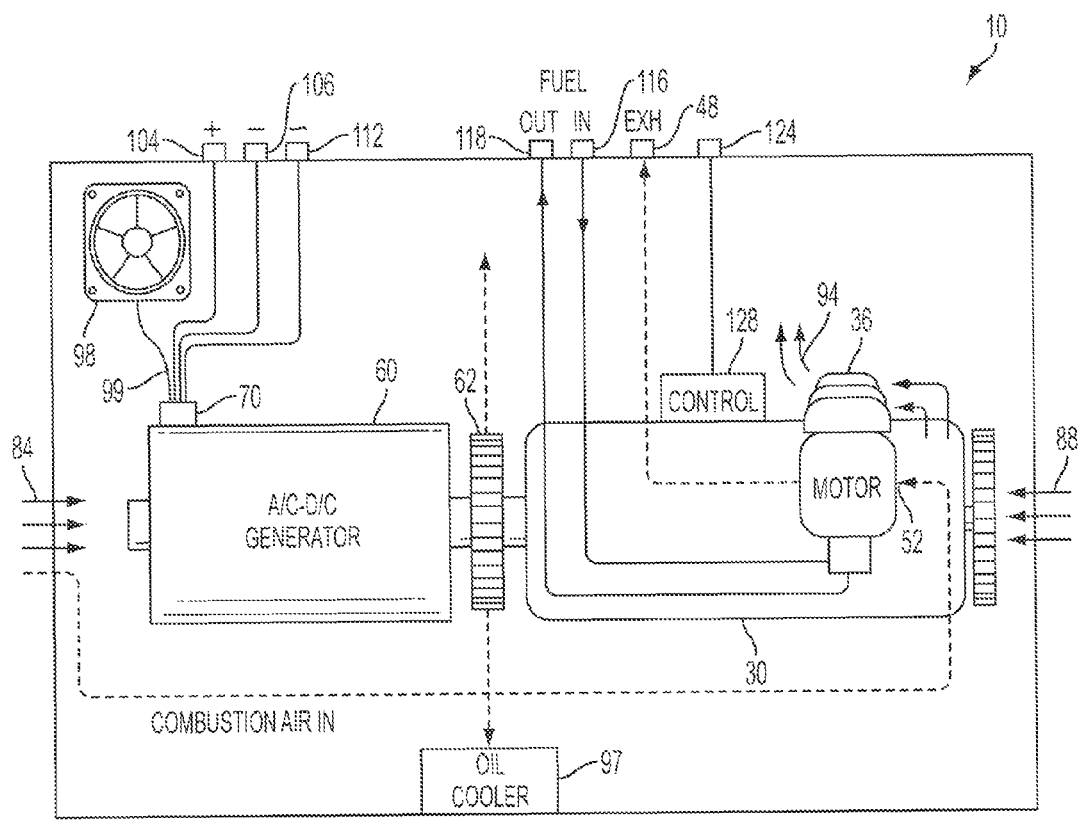
FIG. 3 is a block diagram illustrating air flow paths and electrical wiring of various components of the APU illustrated in FIGS. 1 and 2 in accordance with an exemplary embodiment of the invention.

Referring to FIG. 3, there is illustrated a simplified block diagram of air flow paths and of the electrical wiring of the various components of an exemplary embodiment illustrated in FIGS. 1 and 2. An outline of a plan view of the auxiliary power unit 10 encloses outlines of the air-cooled engine 30 coupled to the brushless generator 60, the oil cooler 97 and the exhaust fan 98. The air-cooled engine 30 includes the cylinder head cooling fins 36 and the flywheel fan 44 described previously. The brushless generator 60 includes an air exit fan 62 and an output connector 70, also described previously. The paths representing the flow of outside air 84 into the brushless generator 60 and outside air 88 into the air-cooled engine 30 are shown as solid arrows pointing inward toward the air entry plenum 68 and the flywheel fan 44 respectively. Air outlet from the brushless generator 60 follows the dashed line paths leading away from the air exit fan 62, with one path passing through the oil cooler 97. The air outlet path 94 from the air-cooled engine 30, after passing through the cylinder head cooling fins 36, follows the solid arrows 94 en route to exiting the enclosure of the APU 10. A combustion air intake path, which enters with the incoming outside air 84, diverges along a separate, dashed line path toward the air-cooled engine. As explained previously, the combustion air flows through an air intake pipe 50 to the air-cooled engine air intake port 52.

Continuing with FIG. 3, wire leads from the output connector 70 include exhaust fan wires 99, the output lead to positive DC output terminal 104, the output lead to negative output terminal 106 and the output leads to the AC output terminal 112. Fuel lines are shown in FIG. 3, including an inlet line from the fuel inlet fitting 116 and a return line to the fuel return fitting 118. The air-cooled engine exhaust pipe 46, represented by a dashed line, connects to the exhaust pipe coupling 48. Wiring from a control panel, located inside the cabin of the transport vehicle as will be described, connects to control terminal 124. From the control terminal 124, wiring connects the control terminal 124 to a control unit 128. Control unit 128, attached to the air-cooled engine 30, or coupled to it by a short cable 129, may be used to facilitate preheating, starting, and running the air-cooled engine 30 during operation of the MU 10 in accordance with an exemplary embodiment of the invention.

Referring to FIG. 4, there is illustrated a pictorial view of the components of a system application in a diesel powered transport vehicle of a heating and air conditioning system employing the MU 10 according to an exemplary embodiment of the invention. Engine exhaust from the air-cooled engine 30 is routed through an outside exhaust tubing 130 to an adapter tap 132 inserted in-line with an exhaust stack 134 of the transport vehicle (not shown). In an exemplary embodiment, the adapter tap 132 is inserted within the flex joint of an exhaust pipe 134. The outside exhaust tubing 130 may be a gas-tight flexible metal tubing material, e.g., a corrugated stainless steel tubing, for ease of installation and the capability to isolate harmonic vibrations traveling in either direction along the outside exhaust tubing 130. Other connections to the MU 10 include the storage battery 136 of the transport vehicle, which is connected via a positive DC output lead 108 and a negative DC output lead 110 to the MU 10. AC leads 114 connect the APU 10 to a distribution panel 172. The control cable 126 connects the MU 10 to a control panel 150. Inlet fuel line 120 and return fuel line 122 connect the respective fittings on the MU 10 with the fuel tank 138 of the transport vehicle via respective standpipe fittings 121, 123.

Inside the cabin of the transport vehicle, typically Under the bunk bed or other convenient location, is installed a self-contained, 110 volt heating and air conditioning (H-A/C) unit 140. A suitable H-A/C unit 140 is Part No. 090-00456 available from SCS/Frigette Corporation, Fort Worth, Tex. 76140. This unit provides 9,000 BTUs of air conditioning and approximately 1,500 watts of electric heating. The H-A/C unit 140 includes several outlets such as air outlet 142 shown in FIG. 4, for connecting to air vents (not shown) within the cabin of the transport vehicle and a return air inlet 144. Also inside the cabin of the transport vehicle is a control panel 150 that includes a green lamp 152 to indicate when the air-cooled engine 30 of the APU 10 is running and an orange lamp 154 to indicate when it is time to change the filter in the H-A/C unit 140. The control panel 150 further includes an ON/OFF switch 156 for the engine ignition, a PREHEAT/START switch 158 for starting the air-cooled engine 30, and an hour meter 160 to log the hours of operation. The control panel 150 is coupled to the APU 10 via control leads 126.

Another unit inside the cabin of the transport vehicle is a thermostat 162, connected to the H-A/C unit 140 via wires 172, for controlling the operation of the H-A/C unit 140. The thermostat 162, which is a standard item typically shipped with the H-A/C unit 140, includes a display to indicate the temperature of the cabin and a preset temperature setting. The thermostat may also include switches 166, 168 for adjusting the temperature setting up or down, respectively. A switch 170 provides ON/OFF control of the H-A/C unit 140. The cabin may also be equipped with first and second AC outlet boxes 146, 148.

The APU 10, the H-A/C unit 140 and the control panel 150 are electrically connected together via a harness assembly 174 shown within the dashed line in FIG. 4. The harness assembly 174 may include all wiring routed to an AC distribution panel 176 and the control lines between the APU 10 and the control panel 150. The harness assembly 174 may include various connectors (not shown) and wiring installation accessories (not shown) for adapting to the particular installation. The AC distribution panel 176 includes circuit breakers for controlling delivery of AC power to the H-A/C unit 140 via wires 184, to the AC outlet boxes 146, 148 via wires 180, 182 respectively and to an auxiliary circuit to other devices on the transport vehicle, such as an engine pre-heater (not shown) for example. The switches in the AC distribution panel may include, or be incorporated into, circuit breakers with ratings suitable for the intended electrical loads.

Figure 5A:
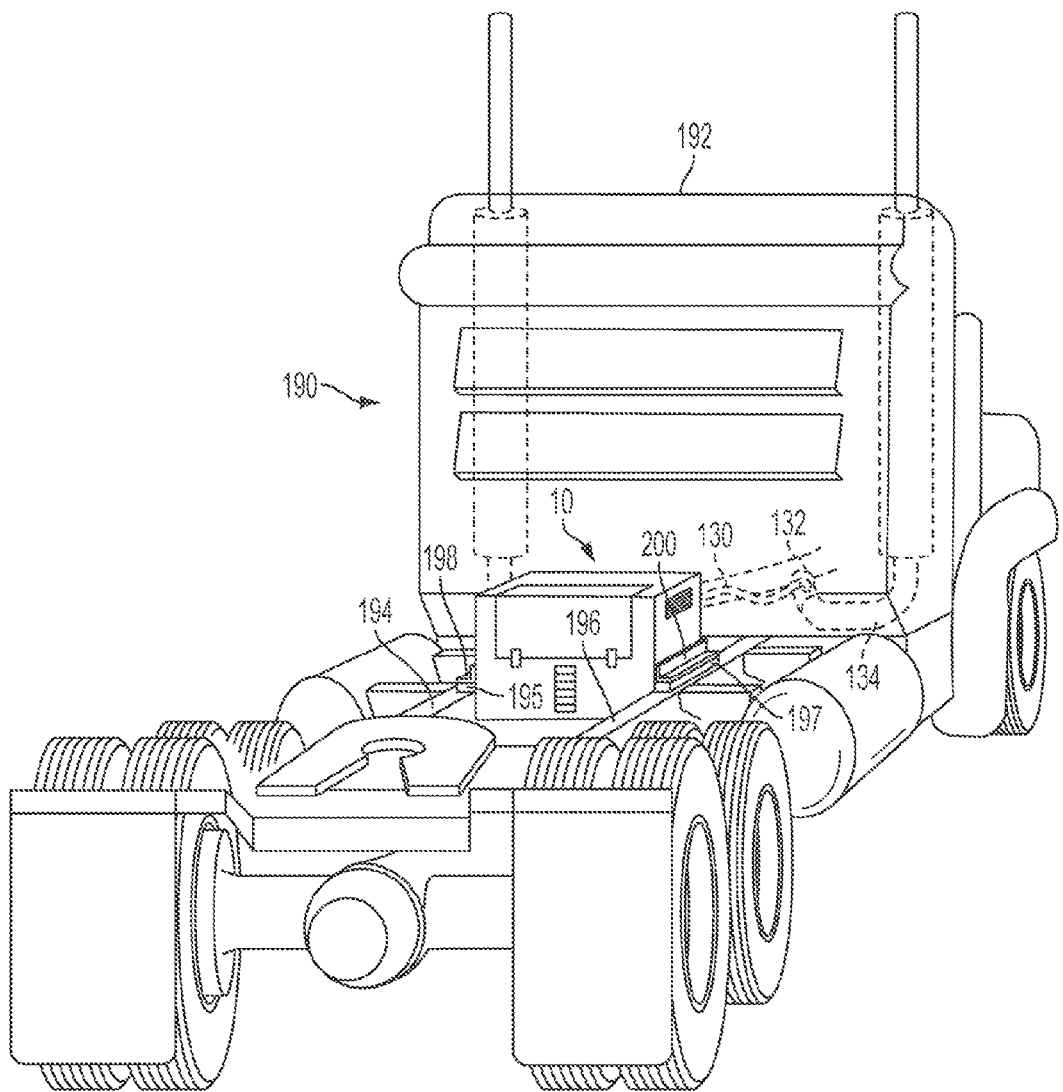
FIG. 5A is a pictorial view illustrating the rear of a truck tractor having an APU installed between the frame rails of the truck in accordance with an exemplary embodiment of the invention.

Referring to FIG. 5A, there is illustrated a pictorial view of the rear of a truck tractor 190 having a cabin 192 and an APU 10 installed between the frame rails 194, 196 of the truck 190 according to an exemplary embodiment of the invention. The APU 10 is supported by angle brackets 198, 200 bolted to the enclosure 12 of the APU 10 and the frame rails 194, 196 respectively. In an exemplary embodiment, the angle brackets 198, 200 are isolated from the frame rails 194, 196 by vibration-absorbing pads 195, 197. A suitable material for the vibration-absorbing pads is neoprene rubber, one-half inch thick. In the illustrative exemplary embodiment, the vibration-absorbing pads are approximately 2½ inches wide and 22 inches long. However, the thickness of the neoprene pads and the durometer thereof may be predetermined according to the results of experiment and characteristics of the particular application. In an alternative exemplary embodiment, the APU may be supported on the transport vehicle using a clamping assembly. A clamping mounting assembly enables the mounting and installation of the APU on the transport vehicle without requiring drilling or welding operations.

In one example of the clamping assembly, L-shaped angle brackets 198, 200, approximately 22 inches long and bolted to the enclosure 12 of the APU 10 along the vertical side of the angle brackets 98, 200, extend approximately two inches fore and aft beyond the front and rear walls, on each side of the enclosure 12. The horizontal sides of the L-shaped angle brackets 198, 200 which extend laterally away from the sides of the enclosure 12, rest on the top of the frame rails 194, 196. Inverted U-bolts, and spacer bars (not shown) drilled to fit over the threaded ends of the U-bolts, may be used to clamp the ends of the L-shaped angle brackets 198, 200 to the frames rails 194, 196 respectively. To absorb vibration, neoprene pads 195, 197 may be installed between the L-shaped angle brackets 198, 200 and the upper side of the frame rails 194, 196 and also between the spacer bars (not shown) and the lower side of the frame rails 194, 196. The APU 10 may thus be supported between the frame rails 194, 196 as shown in FIG. 5A.

Figure 5B:
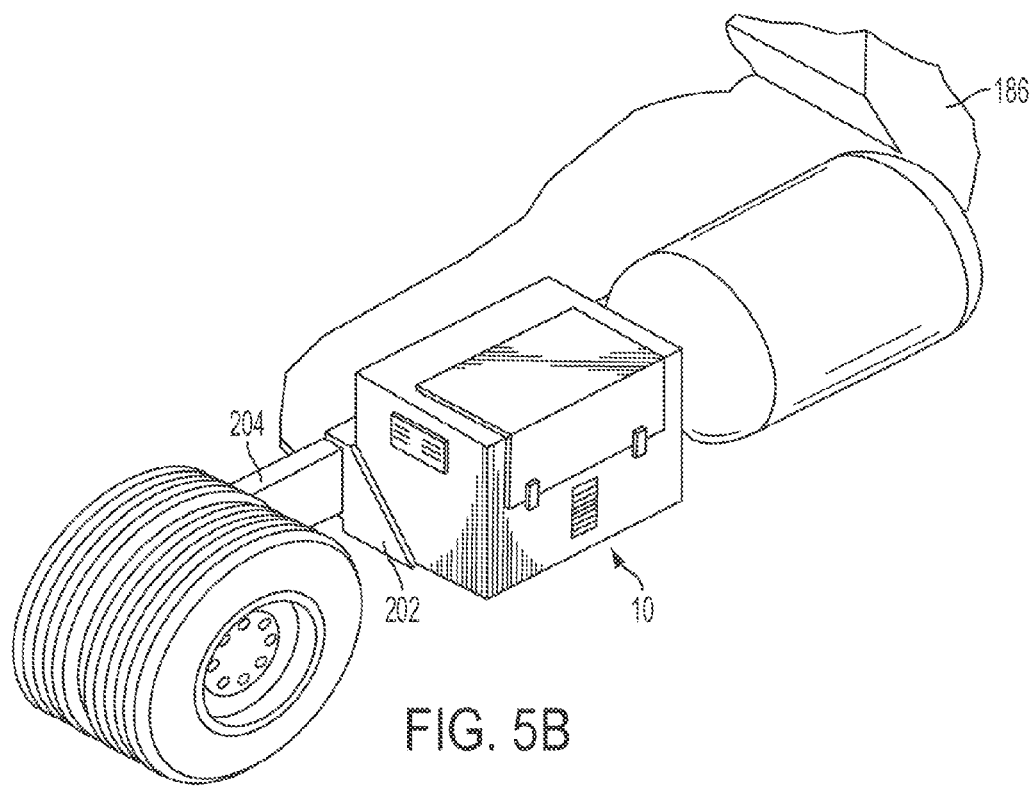
FIG. 5B is a pictorial view illustrating the right side of a truck tractor having an APU installed on the side of a frame rail of the truck in accordance with an exemplary embodiment of the invention.

Also shown in FIG. 5A, in phantom lines, is the connection of the exhaust pipe 130 from the APU 10 to the exhaust pipe 134 of the truck 190 using the adapter 132 as previously described. In FIG. 5B, there is illustrated a pictorial view of the right side of a truck tractor as in FIG. 5A having an APU 10 installed on the side of the truck 192 and supported by a support bracket 202 attached to the frame 204 of the truck 192 in accordance with an exemplary embodiment of the invention. The support bracket 202 may be isolated from the frame 204 by vibration-absorbing pads installed there between or by vibration-absorbing mounts attached to the bottom of the enclosure 12.

To summarize the foregoing, there is disclosed hereinabove an auxiliary power unit (APU) for a transport vehicle powered by an internal combustion engine. An enclosure houses and supports the APU on the transport vehicle. An air-cooled engine within the enclosure directly drives an air-cooled, brushless generator. The generator provides direct, simultaneous AC and DC voltage outputs. Air duct systems within the enclosure separately convey cooling air into, through and out of the air-cooled engine and generator. The cooling air, drawn into the air duct systems by respective direct drive fan means integrated in the air-cooled engine and generator, exits through respective air outlet ducts from the enclosure. In an alternative exemplary embodiment, a system is disclosed comprising a compact, AC operated auxiliary heating and air conditioning unit operable in the cabin of a transport vehicle and powered by the APU described above. The system may include control means coupled to the auxiliary heating and air conditioning unit and the APU, and harness means for coupling the auxiliary heating and air conditioning unit, the APU, and the control means together.

Figure 6A:
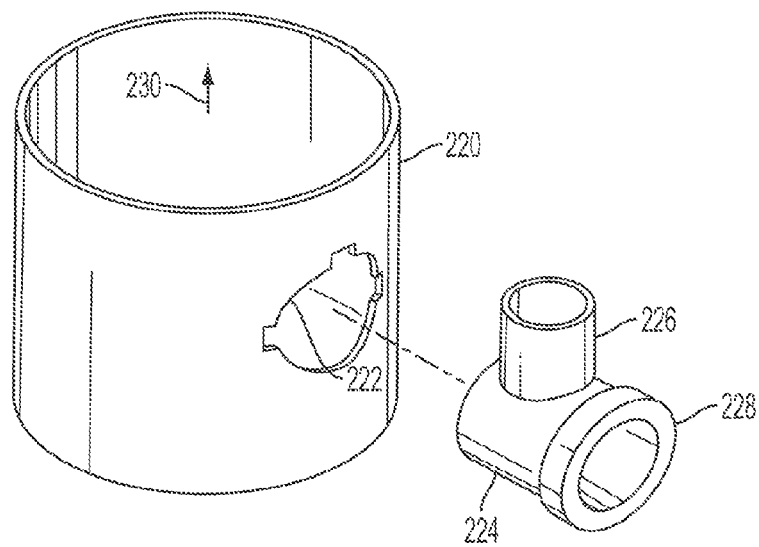
FIG. 6A is a pictorial view illustrating a section of an exhaust stack pipe of a diesel powered transport vehicle and an exhaust adapter in accordance with an exemplary embodiment of the invention.

Referring to FIG. 6A there is illustrated a section of an exhaust stack pipe 220 of a diesel powered transport vehicle and an exhaust adapter 224 according to an exemplary embodiment of the invention. The section of the exhaust stack pipe 220 is similar to the exhaust pipe 134 of the truck 190 as shown in FIG. 5A herein above. The exhaust stack pipe 220 includes an opening 222 cut to receive the exhaust adapter 224 therein. The exhaust adapter 224 has a male end 226 and a female end 228. In the illustrative exemplary embodiment, the male end 226 is used as an outlet disposed inside the exhaust stack pipe 220 such that the exhaust gases from the adapter are directed in the direction 230 as shown in FIG. 7, which is toward the outlet of the exhaust stack pipe 220 of the transport vehicle or truck.

Figure 6B:
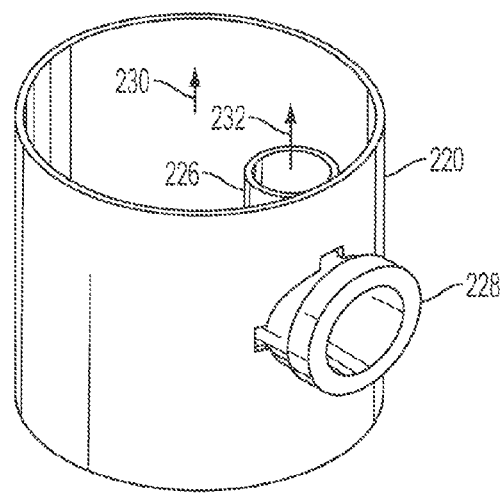
FIG. 6B is a pictorial view illustrating an assembly of the exhaust stack pipe and exhaust adapter shown in FIG. 6A in accordance with an exemplary embodiment of the invention.

Referring to FIG. 6B there is illustrated an assembly of the exhaust stack pipe 220 and exhaust adapter 224 shown in FIG. 6A according to an exemplary embodiment of the invention. As shown in the figure, the adapter 224 is inserted into the opening 22 until the rim of the female end 228 is in contact with the outer surface of the exhaust stack pipe 220. The exhaust adapter 224 may be secured to the exhaust stack pipe 220 by welding it to the exhaust stack pipe 220 in the orientation shown or secured using other mechanical components provided a gas-tight seal that is engineered to tolerate wide temperature extremes and hot engine exhaust gases is used. As assembled in the exhaust stack pipe 220, the exhaust adapter 224 outlets exhaust gases in the direction 232 into the exhaust gas stream coming from the main diesel engine of the transport vehicle and toward the outlet of the exhaust stack pipe 220 of the transport vehicle.

Figure 7:
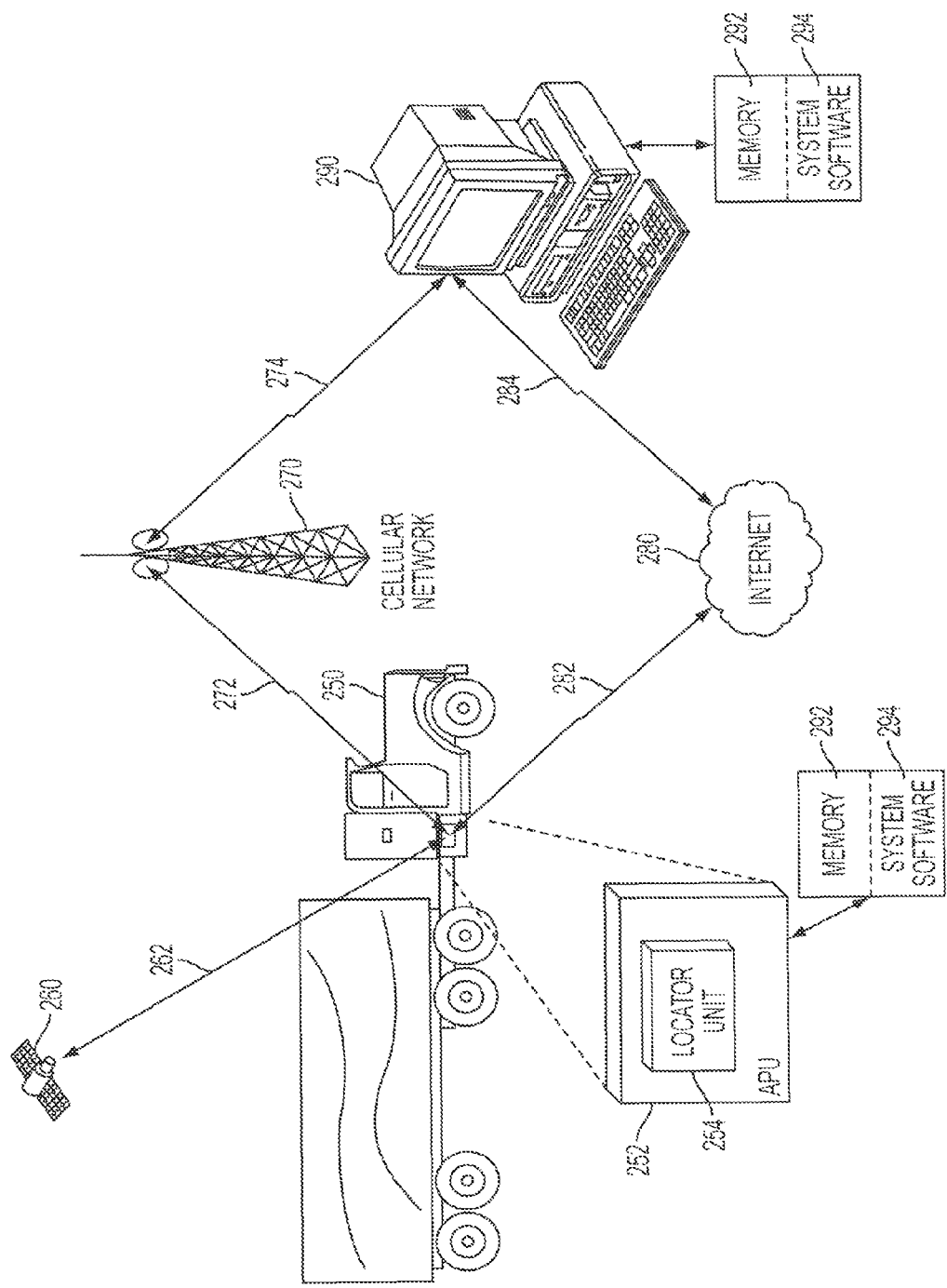
FIG. 7 is a block diagram illustrating an exemplary embodiment of a vehicle monitoring and tracking system for use in combination with the auxiliary power unit (APU) in accordance with an exemplary embodiment of the invention.

Referring to FIG. 7 there is illustrated a block diagram of an exemplary embodiment of a vehicle monitoring and tracking system for use in combination with the auxiliary power unit ("APU") 10 as illustrated in FIG. 1 in accordance with an exemplary embodiment of the invention. In FIG. 7, the APU is shown installed on a transport vehicle 250 and is referred to in the figure by reference number 252. The transport vehicle 250 is typically a diesel powered, long haul, semi-trailer truck that must comply with federal directives that require the driver to rest for 10 hours for each 11 hours that the driver operates the truck (or some other specified periods of time). Before systems became available to operate the comfort (heating and air conditioning) and electrical systems of the truck without operating (i.e., idling) the main diesel engine of the truck, the truck engine was continuously operated during the periods when the driver stopped to rest, have a meal, etc. As previously described, idling the main engine of the truck consumes considerable fuel, increases the wear on the engine, and increases the emissions of environmental pollutants into the atmosphere during the long periods of idling at truck stops, terminals, and other parking facilities.

The APU 252 (See also the APU 10 of FIG. 1) provides an efficient, versatile and low cost solution to the idling problem, enabling the operation of the comfort and electrical systems of the truck with the main engine not running. Thus, during the driver rest periods mandated by the Environmental Protection Agency (EPA) of the federal government, the comfort and electrical systems of the truck may be operated by the APU 252, resulting in much reduced operating cost of the truck, lower fuel costs, reduced wear on the main engine, reduced emissions etc. The tracking system, including the locator unit 254, when utilized in combination with the MU 252 can provide an efficient way to monitor and track the use of the APU 252 and the compliance of the transport vehicle 250 with the EPA directives from a remote location such as a fleet office or dispatching office. This combination of technologies substantially improves fleet management operations by reducing operating costs while complying with the regulations. The locator unit 254 being described herein to illustrate the principles of the invention may be a "Loc8r," which is part of a complete "TrackStar(R) Loc8r System" supplied by Track Star International, Inc. of New Hartford, N.Y. 13411. Qualcomm Inc. of San Diego, Calif. also provides a tracking device that can be used.

Continuing with FIG. 7, a transport vehicle 250 is shown having an APU 252 installed in side-saddle fashion on the lower, right side of the tractor chassis of the transport vehicle 250. Attached to the APU 252 is a locator unit 254. The attachment of the locator unit 254 to the APU 252 includes the various connections to the APU 254 and the transport vehicle 250, which are described hereinafter in conjunction with FIG. 8 but are not shown in FIG. 7. The locator unit 254 may be installed inside the enclosure of the APU 252, depending on such considerations as the particular application and the need for securing the operative portions of the tracking and monitoring system against weather effects, damage or theft.

Other components of the tracking and monitoring system include a global positioning system (GPS), a cellular telephone network ("cell phone network") or other wireless communications network, and a monitoring terminal at a remote location, typically in a fleet manager's office. The GPS is represented by an orbiting satellite 260, the cellular telephone network (or other wireless network) by a cell phone network tower 270 and the monitoring terminal by a personal computer system 290. The GPS antenna in the locator unit 254 receives GPS location signals via the wireless path 262 and outputs them to the circuitry in the locator unit 254 for processing as will be described hereinafter. The cell phone network receives and transmits communication signals to and from the locator unit 254 via a wireless signal path 272. The wireless signal path 272 may in practice be a plurality of paths established by the cell phone network in each instance of a message transmission. The cell phone network also receives and transmits communication signals to and from the monitoring terminal 290 via a wireless signal path 274. The wireless signal path 274 may in practice be a plurality of paths established by the cell phone network in each instance of a message transmission.

The monitoring terminal 290 includes a form of memory 292, such as a database, for storing the input data received from the locator unit 300 on the APU 252 and a system software package 294 for operating the combined tracking and monitoring system of the locator unit 254 on the APU 252. In an alternative exemplary embodiment, the memory 292 for storing input information and the System software package 294 for operating the combined tracking and monitoring system of the locator unit 254 may be included within the locator unit 254 or APU 252.

In an alternate exemplary embodiment, the communication between the monitoring terminal 290 and the locator unit 254 may be conducted via the Internet system 280. The Internet system 280 receives and transmits communication signals to and from the locator unit 254 via a signal path 282. The signal path 282 may include both wired and wireless links and may in practice be a plurality of paths established by the Internet system 280 in each instance of a message transmission. The Internet system 280 also receives and transmits communication signals to and from the monitoring terminal 290 via a signal path 284. The signal path 284 may include both wired and wireless links and may in practice be a plurality of paths established by the Internet system 280 in each instance of a message transmission.

Figure 8:
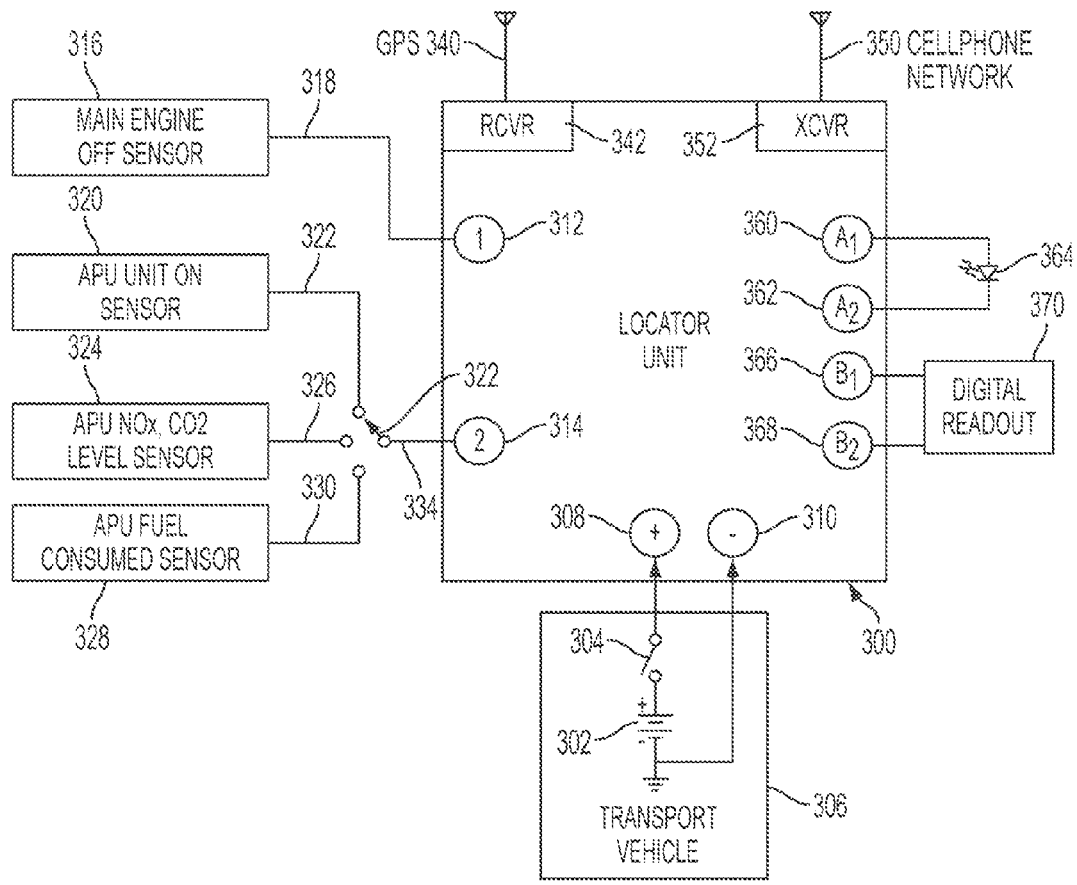
FIG. 8 is a block diagram illustrating a locator unit for use in the vehicle monitoring and tracking system of FIG. 7 in accordance with an exemplary embodiment of the invention.

Referring to FIG. 8 there is illustrated a block diagram of a locator unit 300 for use in the vehicle monitoring and tracking system of FIG. 7 according to an exemplary embodiment. In the illustrative exemplary embodiment, the locator unit 300, which is represented in FIG. 7 as the locator unit 254 attached to or installed in the APU 252, is powered by a storage battery 302 wired through, for example, the ignition switch 304 of the transport vehicle 306 in which the APU 252 is installed. The storage battery 302 is connected to the locator unit 300 via positive and negative terminals 308, 310 respectively of the locator unit 300. The locator unit 300 may be a programmable, microprocessor-controlled device that receives analog sensor inputs, converts them to digital numeric data and processes the numeric data from the sensors along with the location data received from the GPS system via the GPS antenna 340. Further, the locator unit 300 may assemble the location and sensor data in a message packet for communication to a monitoring terminal 290 at a remote location via the cell phone network 270 by sending signals from the cell phone antenna 350. The locator unit 300 may also receive communications from the remote location requesting the data or providing operational instructions to the locator unit 300. The locator unit may also convert the numeric data from the sensor inputs or as received from the remote location into a form suitable for indication or display by the outputs A or B as will be described further hereinafter. The locator unit 300 can comprise a memory (not shown), such as a database, storage medium, or other suitable memory, for storing the sensor and location data.

The locator unit 300 includes first and second sensor inputs 312, 314, respectively. In one configuration, a main engine OFF sensor 316 may be connected to the first sensor terminal 312 via a line 318. The locator unit 300 stores a total of the amount of time the main engine OFF sensor 316 is active, indicating that the main engine is not running. Furthermore, the locator unit 300 stores a total of the amount of time the main engine OFF sensor 316 is not active, indicating that the main engine is running. Similarly, another sensor or a group of sensors may be connected to the second sensor terminal 314. For example, as illustrated in FIG. 8, an APU unit ON sensor 320 may be connected to a first terminal of a switch 332 via a line 322, a nitrogen oxides (NOx) emissions sensor 324 or carbon dioxide (CO2) emissions sensor 324 may be connected to a second terminal of the switch 332 via a line 326, and an APU fuel consumed sensor 328 may be connected to a third terminal of the switch 332 via a line 330. A wiper connectable to each of the first, second and third terminals of the switch 332 may selectively output one of the sensor signals on an output line 334 to connect to the second sensor terminal 314 of the locator unit 300. The locator unit 300 stores the total of the amount of time the APU unit ON sensor 320 is active, indicating that the APU unit is running. The locator unit 300 also stores the total of the amount of time the main APU unit ON sensor 320 is not active, indicating that the APU unit is not running. For the NOx emissions sensor 324, CO2 emissions sensor 324, and the APU fuel consumed sensor 328, the locator unit 300 stores the applicable numeric value associated with the data collected by the corresponding sensor. For example, the locator unit 300 may store the value of the NOx emissions sensor 324 in terms of parts-per-million ("ppm") and the value of the APU fuel consumed sensor 328 in terms of gallons. The foregoing example is illustrative of the variety of possible combinations and configurations of the first and second sensor inputs 312, 314.

The locator unit 300 also may have additional sensor inputs utilized by additional sensors for monitoring values other than the sensors represented in FIG. 8. Furthermore, each sensor may have a separate sensor input dedicated entirely to its input without the need for a switch 332. For example, the following sensors could be connected to the locator unit at sensor inputs: a sensor indicating which type of main engine is connected to the locator unit, a sensor indicating which type of APU is connected to the locator unit, an outside temperature sensor, a volatile organic compound ("VOC") emissions sensor, a carbon monoxide ("CO") emissions sensor, a sulfur dioxide (S02) emissions sensor, and a particulate matter (<10 micrometers) ("PM10") emissions sensor.

Continuing with FIG. 8, a global positioning system ("GPS") antenna 340 is connected to a GPS receiver 342 in the locator unit 300. Similarly, a cellular telephone network ("cell phone network") antenna 350 is connected to a cell phone transceiver 352 in the locator unit 300. The GPS antenna 340 provides signals containing location data to be used by the locator unit 300 to identify the location of the transport vehicle 306 having the APU 10 in which the locator unit 300 is installed. Furthermore, the cell phone network 270 sends location and sensor data in a message packet from the cell phone antenna 350 to a monitoring terminal 290 at a remote location. The structures and operations of the global positioning and cellular telephone network systems are known to those of ordinary skill in the art and will not be described further herein.

The locator unit 300 has outputs A and B for controlling other devices or indicating various status information about the combination of the transport vehicle, APU, and locator unit. For example, output A, having terminals A1 and A2, respectively 360, 362, may be connected to a light emitting diode ("LED") indicator 364. The LED indicator 364 may, for example, emit a green light and be controlled to flash on and off when the main engine OFF sensor 316 is active (providing a signal on line 318) and emit a steady green light when the APU ON sensor 320 is active (providing a signal on line 322 which is input to the locator unit 300 when the switch 332 is positioned to select line 322). In this way the status of the APU locator system may be indicated to the operator of the transport vehicle 306. As a further example, output B, having terminals B1 and B2, respectively 366, 368, may be connected to a digital readout 370 to display a numeric value for the NOx level sensed by the APU NOx level sensor 324, for example, in ppm, when the switch 332 is positioned to select the signal on line 326. Similarly, the digital readout 370 may display a numeric value for the fuel consumed sensed by the APU fuel consumed sensor 328, for example, in tenths of a gallon, when the switch 332 is positioned to select the signal on line 330.

The locator unit 300 also may have additional outputs, LED indicators 364, and digital 30 readouts 370 to display a numeric value for additional sensor inputs. For example, the following additional sensor inputs could occupy additional outputs located on the locator unit 300 and further supply additional digital readouts 370 to display a number reflecting the value of the sensor: outside temperature sensor, VOC emissions sensor, CO emissions sensor, SO2 emissions sensor, and PM10 emissions sensor.

As previously discussed, some jurisdictions have created programs to provide economic incentives for achieving reductions in the emissions of pollutants. In these programs, a regulatory body sets a cap on the amount of a pollutant that can be emitted. For example, a freight company with a large fleet of vehicles is given credits which represent the right to emit a specific amount of those pollutants. The total amount of credits given to the freight company cannot exceed the cap, which limits total emissions to that level. Therefore, if the freight company exceeds the number of credits they have, it would have to buy credits from another entity that did not exceed its total credits. Otherwise, the company exceeding its credits faces potential fines and sanctions from the regulatory body. In the alternative, if the freight company did not exceed its total credits, it could sell the excess credits to another entity that requires them.

The transfers of emission credits are referred to as trades and occur in an emissions trading program. A variety of emissions trading programs are active around the world, and different trading programs deal with a variety of types of emissions credits. For example, some emissions trading programs trade NOx emission credits while others trade PM10 emissions credits. Therefore, the ability to accurately monitor emissions data from multiple sensor inputs to calculate emissions reduction credits can provide an additional income stream to companies who reduce their emissions and regularly have excess credits.

Figure 9:
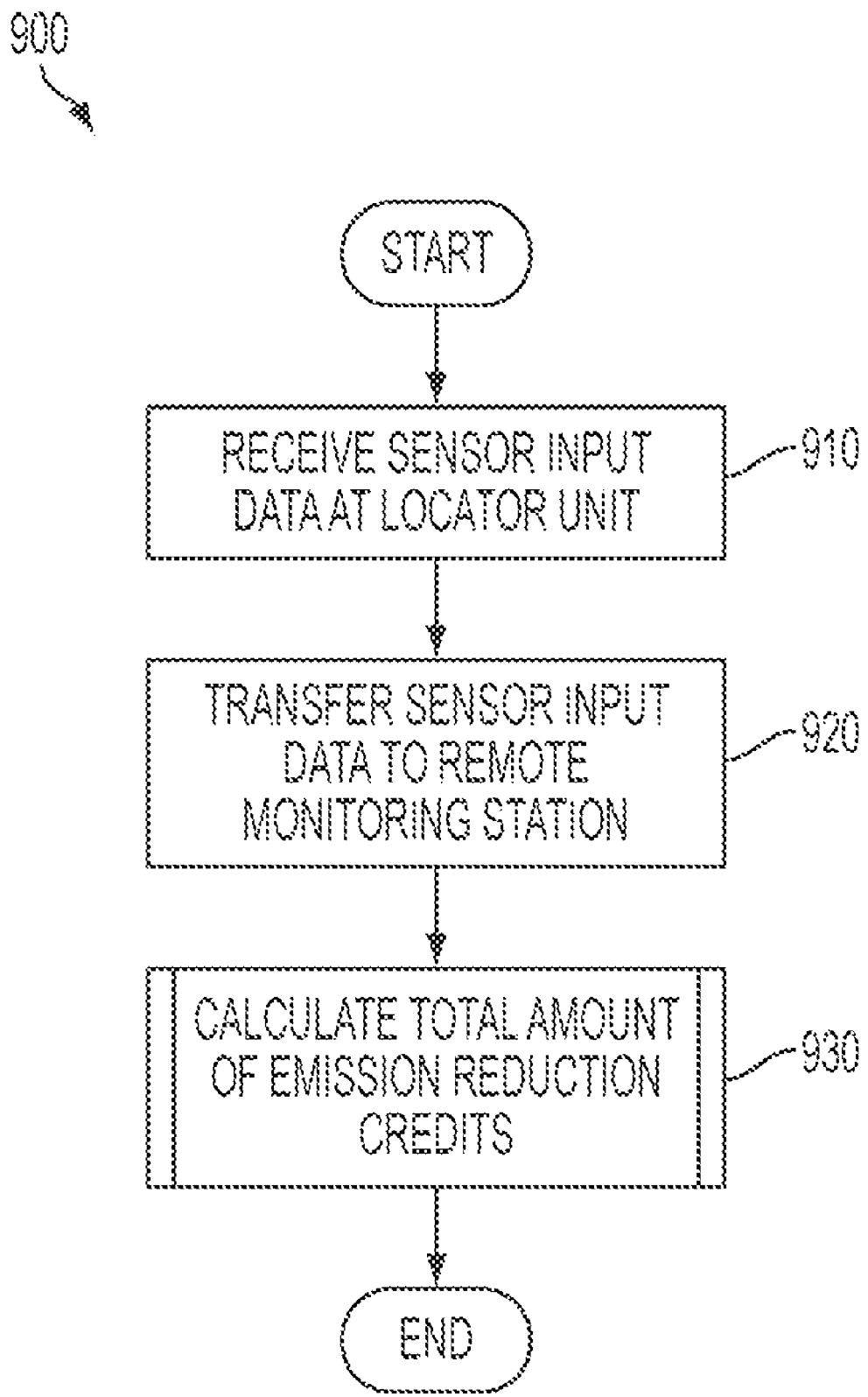
FIG. 9 is a flow chart illustrating a method for determining emission reduction credits in accordance with an exemplary embodiment of the invention.

FIG. 9 is a flow chart illustrating a method for determining emission reduction credits in accordance with an illustrative embodiment of the invention. In Step 910, the locator unit 300 receives data from all of the input sensors and stores this data along with the location information data from the UPS antenna 340. More specifically, the locator unit 300 receives analog sensor inputs, converts them to digital numeric data and processes the numeric data from the sensors along with the location data received from the GPS system via the GPS antenna 340 and stores the information in a database or on a storage medium along with a time stamp. The sensor data may include specific levels of each pollutant sensed by each sensor, and/or may include an indication of which engine was running (e.g., main vehicle engine or APU) and for how long.

In Step 920, the locator unit 300 transfers the location and sensor data to the remote monitoring station 290. In an exemplary embodiment, the locator unit 300 assembles the location and sensor data in a message packet for communication to the memory 292 on a monitoring terminal 290 at a remote location via the cell phone network 270 by sending signals from the cell phone antenna 350. Finally, in Step 930, the system software 294 on the monitoring terminal 292 calculates the emissions credits based on the locator and sensor data. For a detailed discussion of how the system software calculates the emissions credits, see FIG. 11 hereinafter.

Figure 10:
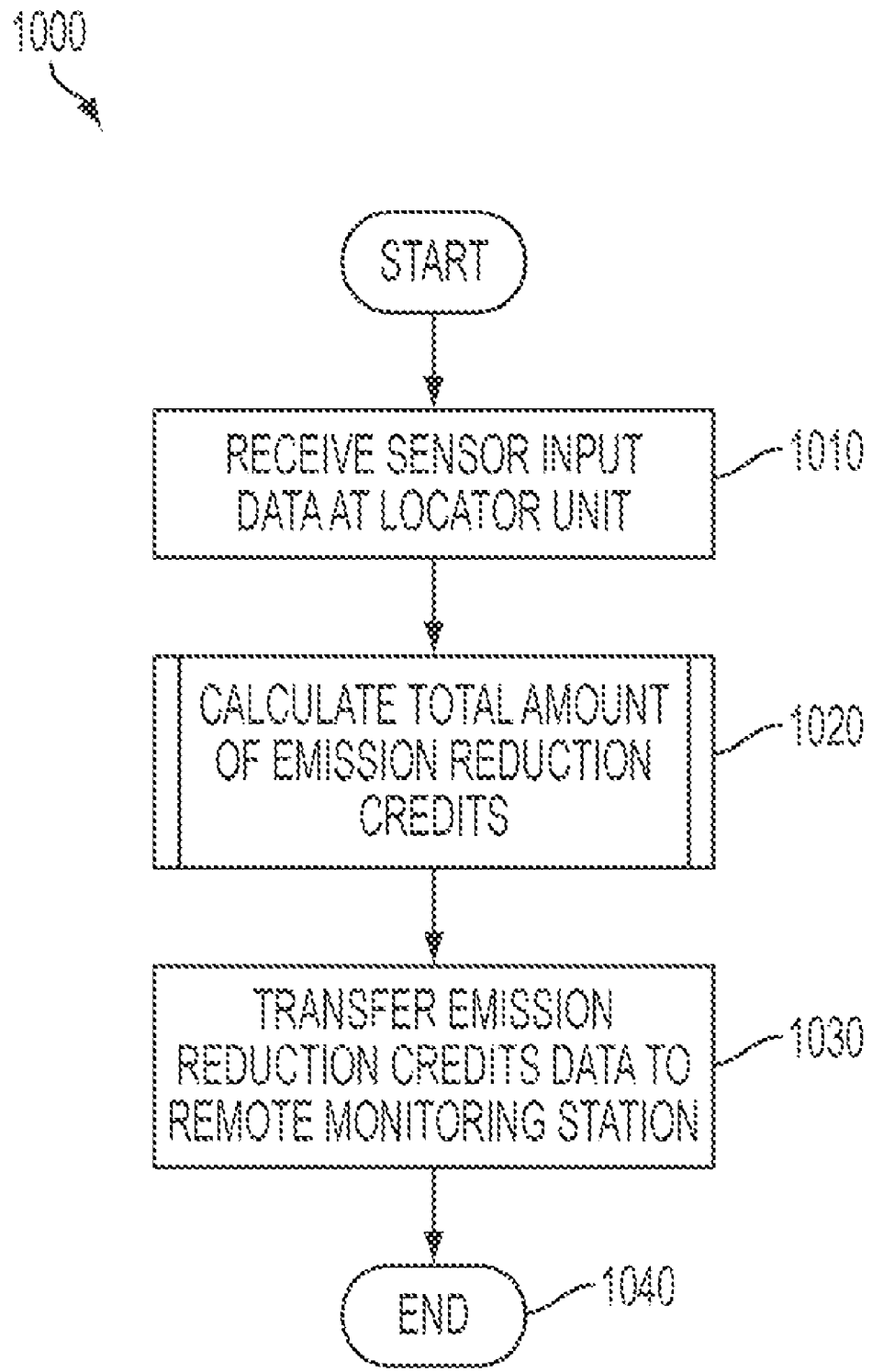
FIG. 10 is a flow chart illustrating a method for determining emission reduction credits in accordance with an alternative exemplary embodiment of the invention.

FIG. 10 is a flow chart illustrating a method for determining emission reduction credits in accordance with an alternative illustrative embodiment of the invention. FIG. 10 reflects an illustrative embodiment when the emission reduction credit calculations are performed at the APU 252 instead of the remote monitoring station 290. In Step 1010, the locator unit 300 receives data from all of the input sensors and stores this data along with the location information data from the GPS antenna 340. More specifically, the locator unit 300 receives analog sensor inputs, converts them to digital numeric data and processes the numeric data from the sensors along with the location data received from the UPS system via the GPS antenna 340 and stores the information in a database or other storage medium along with a time stamp.

In Step 1020, the system software 294 on the monitoring terminal 292 calculates the emissions credits based on the location and sensor data. For a detailed discussion of how the system software 294 calculates the emissions credits, see FIG. 11 hereinafter. Finally, in Step 1030, the locator unit 300 transfers the emissions credit data to the remote monitoring station 290. In an illustrative embodiment, the locator unit 300 assembles the emissions credit data in a message packet for communication to the memory 292 on a monitoring terminal 290 at a local or remote location via the cell phone network 270 by sending data from the cell phone antenna 350.

Figure 11:
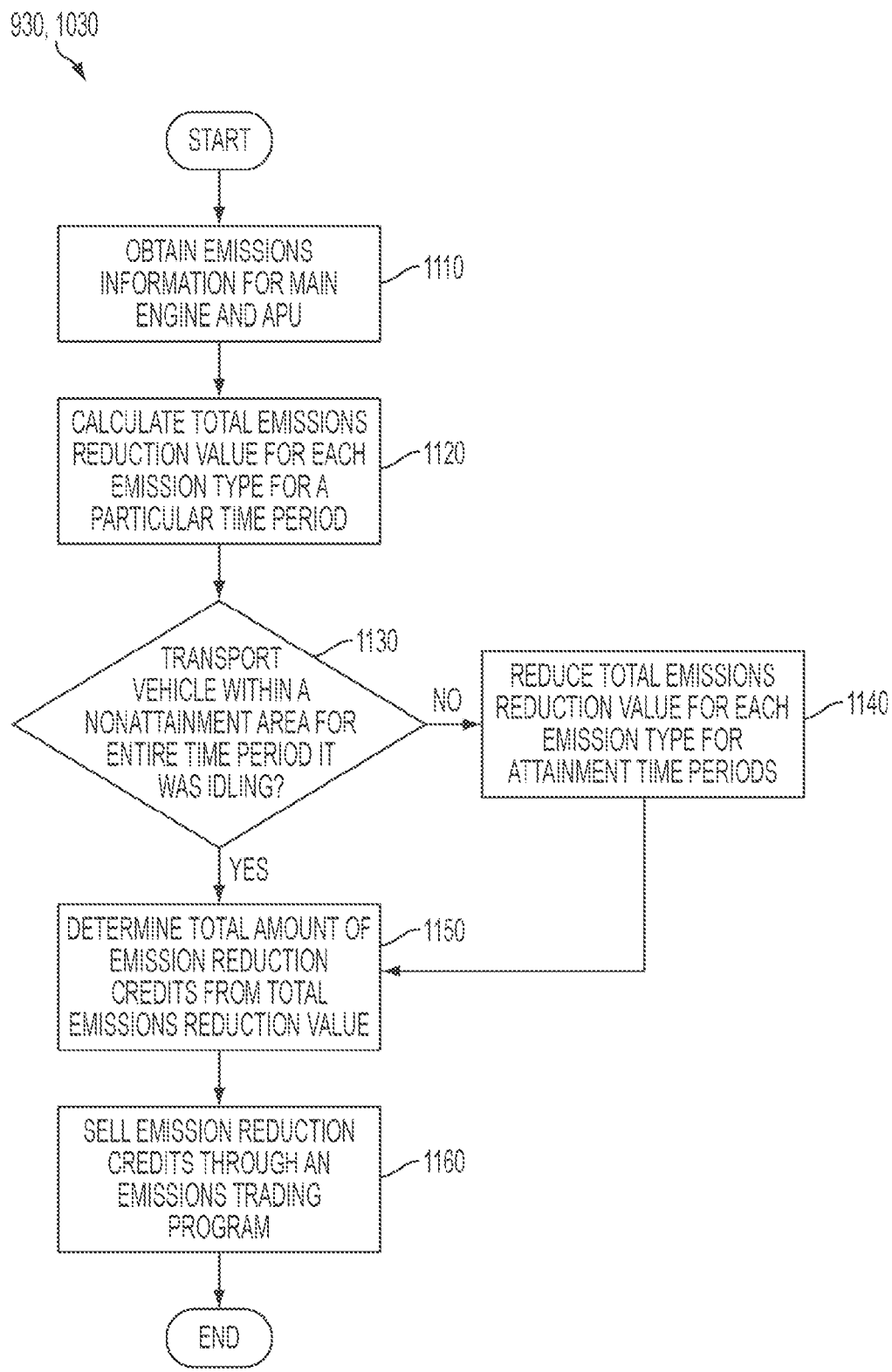
FIG. 11 is a flow chart illustrating a method for calculating emission reduction credits in accordance with an exemplary embodiment of the invention.

FIG. 11 is a flow chart illustrating a method for calculating emission reduction credits in accordance with an illustrative embodiment of the invention. As discussed above with reference to FIGS. 9 and 10, the system software 294 that performs the illustrative method illustrated in FIG. 11 may be located at a remote monitoring station 290 or the APU 290, respectively. In Step 1110, the system software 294 obtains standard emissions information for the main engine and APU 252 of the transport vehicle. Engine manufacturers produce standard emissions information for their engines. In illustrative embodiments, the standard emissions information for the main engine and APU may be directly input into the system software 294; a user can select the appropriate engines from a database or lookup table in the system software 294 that contains a listing of engines and their emissions information; or the locator unit 300 can transmit the engine types to the system software 294 based on a sensor input reading. The standard emissions information comprises emissions output per time increment for engine operation and APU operation. The standard engine emissions information may be used as a baseline value in the calculation of the emission reductions credits. Alternatively, individual sensors may be used to sense the amounts of each pollutant over time.

Next, in Step 1120, the system software 294 calculates the total emissions reduction value for each emissions type for a particular time period based on the amount of time the vehicle's main engine or APU 252 was in operation, thereby determining a reduction in the vehicle's emissions output due to running the vehicle's APU 252 instead of the vehicle's main engine during the time period. As noted above, the locator unit 300 monitors and stores the total amount of time that the main engine and APU 252 are on and off.

By way of example only, the standard emissions information obtained in Step 1110 for the main engine may be NOx=1.8 g/Bhp-hr, CO=15.5 g/Bhp-hr, and PM10=0.01 g/Bhp-hr; and the standard emissions information obtained in Step 1110 for the APU 252 may be NOx=0.3 g/Bhp-hr, CO=2.6 g/Bhp-hr, and PM10=0 g/Bhp-hr. The unit of g/Bhp-hr represents grams (g) per brake horsepower (Bhp)-hour (hr). A brake horsepower is the measure of an engine's horsepower without the loss in power caused by the gearbox, generator, differential, water pump and other auxiliaries. The actual horsepower delivered to the driving wheels is less. Other units for measuring emissions are suitable and are within the scope of the invention. Furthermore, suppose the system software 294 will calculate the total emissions value for the transport vehicle for a time period between 8:00 AM and 6:00 PM on Jul. 14, 2006. The time period is for illustrative purposes only, and the total emissions value may be calculated for time periods longer or shorter than the illustrative ten hour period represented here. If a transport vehicle with an APU 252 drives ten hours continuously between 8:00 AM and 6:00 PM on Jul. 14, 2006, the main engine operates the entire time; therefore, the total amount of NOx emissions for the ten hour period is 1.8 g/Bhp-hr*10.0 hr—18.0 g/I3 hp. This total emissions value represents the maximum value of emissions for this time period. Furthermore, for a transport vehicle without an APU that idles its main engine for the entire ten hour period between 8:00 AM and 6:00 PM on Jul. 14, 2006, the main engine will still operate the entire time; therefore, the total amount of NOx emissions for the ten hour period also is 1.8 g/Bhp-hr*10 hr=18.0 g/Bhp. However, if a transport vehicle operates its APU 252 for the entire ten hour period between 8:00 AM and 6:00 PM on Jul. 14, 2006, the APU 252 will operate the entire time; therefore, the total amount of NOx emissions for the ten hour period is only 0.3 g/Bhp-hr*10 hr=3.0 g/13 hp. Therefore, the transport vehicle with an APU 252 reduces the total amount of NOx emissions by 15.0 g/Bhp for this time period. This reduction value is used to subsequently determine the emission reduction credits.

The two NOx emission values of 18.0 g/Bhp when the transport vehicle's main engine is running during the entire illustrative ten hour period and 3.0 g/i3 hp when the transport vehicle's APU 252 is running for the entire illustrative ten hour period represent the two extreme NOx emission values for a ten hour period. Therefore, a combination of running the main engine and running the APU 252 for a total of ten hours for this example would create a total amount of NOx emissions that falls between 3.0 g/Bhp and 18.0 g/Bhp. By way of example only, suppose that a transport vehicle operated its APU 252 for two hours, drove for 6 hours (i.e., main engine running), and then operated its APU 252 for two additional hours. Because the APU 252 operates for four hours, the amount of NOx emission for this four hours would be 0.3 g/Bhp-hr*4 hr=1.2 g/Bhp. However, if the APU was not operating for these four hours (i.e., main engine running), the amount of NOx emissions would be 1.8 g/Bhp-hr*4.0 hr=7.2 g/Bhp. Therefore, for the situation where a transport vehicle operates its APU 252 for four hours and drives for six hours during a ten hour time period, the total reduction of NOx emissions is 7.2 g/Bhp=1.2 g/Bhp=6.0 g/Bhp. These same calculations above could be used to determine the total emissions reduction value for the CO and PM10 emissions, or other emissions, for the time period in this example.

In an alternative illustrative embodiment, the sensors attached to the locator unit can monitor and record the actual emission values produced by the main engine and the APU 252. The sensors can then transmit these actual emission values for each of the different emission sensors to the locator unit. The actual emission values may then be used to perform the calculations above with respect to determining the total emissions reduction value for a particular time.

Before determining the emission reduction credits in Step 1150, in Step 1130, the system software 294 first determines whether the transport vehicle was located in a nonattainment area during all of the periods where the APU 252 was utilized to reduce total emissions. The EPA has defined areas of the country as nonattainment or attainment areas based on six "criteria pollutants" as indicators of air quality and has defined for each of those pollutants a maximum concentration above which adverse effects on human health may occur. A nonattainment area is any area that does not meet (or that contributes to ambient air quality in a nearby area that does not meet) the national primary or secondary ambient air quality standard for the pollutant. An attainment area is any area that meets the national primary or secondary ambient air quality standard for the pollutant. For more information about the EPA nonattainment and attainment areas, see http://www (dot) epa (dot) gov/oar/oaqps/greenbk/o3co.html, herein incorporated by reference. To qualify for emission reduction credits, it is the responsibility of the entity applying for the credits to verify they were in a nonattainment area when idling (i.e., operating the APU 252 instead of the main engine) for calculating their total emissions reduction value for particular emission types. Because truckers are required to rest at least a predefined amount of time after driving for a specified period of time, truckers often leave their engines running while resting in a nonattainment (or attainment) area.

Therefore, in Step 1130, the system software 294 uses the locator data received by the locator unit 300 from the GPS system via the GPS antenna 340 to verify whether the transport vehicle was located in a nonattainment area during periods of idling. The system software 294 uses the locator data in connection with the defined EPA nonattainment and attainment areas which may be included in a database with the system software 294, or may be obtained via the wireless network. As mentioned above, this step is used because the EPA (or other regulatory entity) requires entities applying for emission reduction credits to prove they were located in a nonattainment area to qualify. If the system software 294 in Step 1130 determines that the transport vehicle was in a nonattainment area during the entire defined time period, the system software 294 proceeds to Step 1150 to determine the emission reduction credits based on the emissions reduction value calculated in step 1120.

However, if the system software 294 determines in Step 1130 that the transport vehicle was not in a nonattainment area during the entire defined time period, the system software 294 proceeds to Step 1140 to reduce the total emissions reduction value for the emission types based on the amount of time the vehicle was not in a nonattainment area during the time period. In this case, the system software 294 determines the amount of time within the defined time period that the transport vehicle was outside of a nonattainment area. By way of example only, and using the example standard emission values listed above along with the hypothetical example above, suppose a transport vehicle with an APU 252 idles (i.e., operates its APU 252 only) for two hours in a nonattainment area; drives for six hours; and then idles (i.e., operates its APU 252 only) for two additional hours in an attainment area. In the previous example described with reference to step 1120, a transport vehicle with an APU 252 that drove for six hours and operated its APU 252 for four hours reduced the NOx emission value by 6.0 g/Bhp. However, for this illustrative calculation, the entity who owns the transport vehicle does not qualify for emission reduction credits for the two hours the transport vehicle idled in the attainment area. Therefore, the calculation is performed by only including only the two hours the APU 252 operates in the nonattainment area. In other words, the amount of the total emissions reduction value is reduced by the amount attributable to the time the vehicle operated its APU in the attainment area. Thus, the amount of NOx emission for this two hours is 0.3 g/Bhp-hr*2.0 hr=0.6 g/Bhp. However, if the APU was not operating for these two hours, the amount of NOx emissions would be 1.8 g/13 hp-hr*2.0 hr=3.6 g/Bhp. Therefore, for the situation where a transport vehicle with an APU 252 idles (i.e., operates its APU 252 only) for two hours in a nonattainment area, drives for six hours, and then idles for two additional hours in an attainment area during a ten hour time period, the total reduction of NOx emissions is only 3.6 g/Bhp–0.6 g/13 hp=3.0 g/Bhp. After reducing the total emissions reduction value in step 1140, the method proceeds to step 1150.

In Step 1150, the total amount of emission reduction credits are determined based on the appropriate emissions reduction value according to an illustrative embodiment. The total amount of emission reduction credits will correspond to the value of the total reduction of a particular emission type. For example, if the total reduction of NOx emissions is 3.0 g/Bhp, the total amount of emission reduction Credits may be 3.0; however, if the total reduction of NOx emissions was 6.0 g/Bhp, the total amount of emission reduction credits may be 6.0. To determine the corresponding values between the total reduction and the total amount of reduction credits, chart values from the EPA (or other regulatory body) may be incorporated into the system software 294.

Finally, in Step 1160, the emission reduction credit can be sold through an emissions trading program. A variety of emissions trading programs are active around the world, and different trading programs deal with a variety of types of emission reduction credits. Typically, the holder of the emission reduction credits will utilize a brokerage firm to sell the emission credits through one of the emissions trading programs.

For example, vehicle operators may voluntarily sign a binding legal agreement with a climate exchange, e.g., the Chicago Climate Exchange of Chicago, Ill., which may then certify or approve the locator unit 300 or other monitoring device resident on each vehicle as described herein. The climate exchange may trade commodities referred to as credits or contracts, each of which represents 100 metric tons of CO2 equivalent, or some other predetermined amount of pollutant. Exchange contracts may be comprised of exchange allowances and exchange offsets. Exchange allowances may be issued to emitting members of the exchange in accordance with their emission baseline and a predefined emission reduction schedule. Exchange offsets are generated by qualifying offset projects, such as is described herein.

While aspects of the invention described have been described above with respect to long-haul semi-trailer trucks (class 7 and 8 trucks, which require a commercial driver's license to legally operate), the innovations described herein are also applicable to other vehicular and automotive technologies including, but not limited to, busses (e.g., school, commercial, municipal, private tours, public transit, etc.), recreational vehicles ("RVs"), construction machinery, light- and medium-duty trucks (e.g., class 1-6 trucks), automobiles, or any other gasoline, hydrogen, and/or electric-powered vehicle, or any other vehicle that emits a controlled and/or regulated pollutant. Other forms of transportation may benefit as well, e.g., locomotives, airplanes, and boats may use auxiliary power while not underway. Any type of engine idling may be monitored using one or more aspects described herein, e.g., idling by plugging an electrical cord into an electrical outlet while at a rest stop of truck stop, or by performing any other type of reduced emissions idling.

It should be understood that the foregoing relates only to illustrative embodiments of the invention, and that numerous changes may be made therein without departing from the scope and spirit of the invention as defined by the following claims.

What is claimed is:

1. A computer-implemented method for determining emission reduction credits, comprising:
    receiving data for a transport vehicle from a plurality of sensors, wherein one of the plurality of sensors comprises a location sensor, and wherein a second of the plurality of sensors identifies which of at least two power sources of the transport vehicle are in operation;
    based on the data received from the location sensor, determining whether the transport vehicle is located within a nonattainment area; and
    when the transport vehicle is within the nonattainment area, based on the data received from the second sensor generating an emission reduction credit attributable to the transport vehicle for one or more emission types for an amount of time during which the transport vehicle is located in the nonattainment area.

2. The method of claim 1, wherein the first of the at least two power sources comprises a main engine of the transport vehicle, said main engine providing electrical power and mechanical output to drive the transport vehicle, and
    wherein the second of the at least two power sources comprises an auxiliary power unit of the transport vehicle, said auxiliary power unit not usable to drive the transport vehicle.

3. The method of claim 2, wherein each power source of the at least two power sources has corresponding known emissions information, and wherein the auxiliary power unit has less emissions than the main engine.

4. The method of claim 3, wherein generating the emission reduction credit attributable to the transport vehicle comprises generating the emission reduction credit attributable to the transport vehicle when the second sensor indicates the auxiliary power unit is operational and the main engine is not operational while the transport vehicle is in the nonattainment area.

5. The method of claim 2, wherein the second sensor provides an information signal indicating whether the main engine of the transport vehicle is running, and an information signal indicating whether the auxiliary power unit of the transport vehicle is running.

6. The method of claim 2, wherein generating the emission reduction credit comprises:
    obtaining standard emissions data for one or more emission types for the main engine of the transport vehicle;
    obtaining standard emissions data for the one or more emission types for the auxiliary power unit of the transport vehicle;
    determining whether the transport vehicle was located within a nonattainment area while the auxiliary power unit was running;
    determining an emissions reduction value based on an amount of time that the transport vehicle was located within a nonattainment area while the auxiliary power unit was running; and
    determining the emission reduction credit based on the emissions reduction value.

7. The method of claim 6, wherein calculating the emissions reduction value for each of the one or more emission types comprises:
    multiplying an amount of time the auxiliary power unit was running by the standard emission data for each emission type for the auxiliary power unit to obtain a first value for each emission type;
    multiplying an amount of time the auxiliary power unit was running by the standard emission data for each emission type for the main engine to obtain a second value for each emission type; and
    subtracting, for each emission type, the first value from the second value to obtain the total emissions reduction value for each emission type.

8. One or more non-transitory computer readable media comprising computer readable instructions that, when executed, determine emission reduction credits by:
    receiving data for a transport vehicle from a plurality of sensors, wherein one of the plurality of sensors comprises a location sensor, and wherein a second of the plurality of sensors identifies which of at least two power sources of the transport vehicle are in operation;
    based on the data received from the location sensor, determining whether the transport vehicle is located within a nonattainment area; and
    when the transport vehicle is within the nonattainment area, based on the data received from the second sensor generating an emission reduction credit attributable to the transport vehicle for one or more emission types for an amount of time during which the transport vehicle is located in the nonattainment area.

9. The computer readable media of claim 8, wherein the first of the at least two power sources comprises a main engine of the transport vehicle, said main engine providing electrical power and mechanical output to drive the transport vehicle, and wherein the second of the at least two power sources comprises an auxiliary power unit of the transport vehicle, said auxiliary power unit not usable to drive the transport vehicle.

10. The computer readable media of claim 9, wherein each power source of the at least two power sources has corresponding known emissions information, and wherein the auxiliary power unit has less emissions than the main engine.

11. The computer readable media of claim 10, wherein generating the emission reduction credit attributable to the transport vehicle comprises generating the emission reduction credit attributable to the transport vehicle when the second sensor indicates the auxiliary power unit is operational and the main engine is not operational while the transport vehicle is in the nonattainment area.

12. The computer readable media of claim 9, wherein the second sensor provides an information signal indicating whether the main engine of the transport vehicle is running, and an information signal indicating whether the auxiliary power unit of the transport vehicle is running.

13. The computer readable media of claim 9, wherein generating the emission reduction credit comprises:
obtaining standard emissions data for one or more emission types for the main engine of the transport vehicle;
obtaining standard emissions data for the one or more emission types for the auxiliary power unit of the transport vehicle;
determining whether the transport vehicle was located within a nonattainment area while the auxiliary power unit was running;
determining an emissions reduction value based on an amount of time that the transport vehicle was located within a nonattainment area while the auxiliary power unit was running; and
determining the emission reduction credit based on the emissions reduction value.

14. The computer readable media of claim 13, wherein calculating the emissions reduction value for each of the one or more emission types comprises:
multiplying an amount of time the auxiliary power unit was running by the standard emission data for each emission type for the auxiliary power unit to obtain a first value for each emission type;
multiplying an amount of time the auxiliary power unit was running by the standard emission data for each emission type for the main engine to obtain a second value for each emission type; and
subtracting, for each emission type, the first value from the second value to obtain the total emissions reduction value for each emission type.

15. A transport vehicle, comprising:
a main engine for providing power to one or more axles of the transport vehicle;
an auxiliary power unit for providing power to one or more electrical systems of the transport vehicle;
a data processing unit operable in accordance with stored computer executable instructions that, when executed by the data processing unit, determine emission reduction credits, said instructions comprising:
receiving data for the transport vehicle from a plurality of sensors, wherein one of the plurality of sensors comprises a location sensor, and wherein another one of the plurality of sensors is usable to determine an amount of pollutant output by the transport vehicle;
based on the data received from the location sensor, determining that the transport vehicle is located within a nonattainment area; and calculating an emission reduction credit attributable to the transport vehicle for one or more emission types, based on the data received from the sensor usable to determine the amount of pollutant, for an amount of time during which the transport vehicle is located in the nonattainment area.

16. The transport vehicle of claim 15, wherein the received data comprises an information signal indicating whether a main engine of the transport vehicle is running, and an information signal indicating whether an auxiliary power unit of the transport vehicle is running.

17. The transport vehicle of claim 15, wherein calculating the emission reduction credit comprises:
obtaining standard emissions data for one or more emission types for a main engine of the transport vehicle;
obtaining standard emissions data for the one or more emission types for an auxiliary power unit of the transport vehicle;
calculating a total emissions reduction value for each of the one or more emission types for a defined time period;
determining whether the transport vehicle was located within a nonattainment area while the auxiliary power unit was running during the defined time period;
reducing the total emissions reduction value for each of the plurality of emission types in response to a determination that the transport vehicle was located within a nonattainment area while the auxiliary power unit was running during the defined time period, based on an amount of time that the transport vehicle was located within the nonattainment area while the auxiliary power unit was running during the defined time period; and
determining the emission reduction credit based on the total emissions reduction value.

18. The transport vehicle of claim 17, wherein calculating a total emissions reduction value for each of the one or more emission types comprises:
multiplying an amount of time the auxiliary power unit was running during the defined time period by the standard emission data for each emission type for the auxiliary power unit to obtain a first value for each emission type;
multiplying an amount of time the auxiliary power unit was running during the defined time period by the standard emission data for each emission type for the main engine to obtain a second value for each emission type; and
subtracting, for each emission type, the first value from the second value to obtain the total emissions reduction value for each emission type.

19. The transport vehicle of claim 15, wherein said transport vehicle comprises a class of truck requiring a commercial driver's license to legally operate.

20. The transport vehicle of claim 15, wherein said transport vehicle is one of a locomotive and a commercial bus.

* * * * *